US012769086B2

(12) United States Patent
Takahashi et al.

(10) Patent No.: US 12,769,086 B2
(45) Date of Patent: Oct. 20, 2026

(54) OPTICAL DRIVING APPARATUS

(71) Applicant: PiAct Corp., Tokyo (JP)

(72) Inventors: Yasushi Takahashi, Tokyo (JP); Minoru Kuwana, Osaka (JP); Yasuhiro Okamoto, Osaka (JP); Takao Kobayashi, Osaka (JP); Takehiro Kano, Osaka (JP); Sheng Lu, Shanghai (CN)

(73) Assignee: PiAct Corp., Tokyo (JP)

( * ) Notice: Subject to any disclaimer, the term of this patent is extended or adjusted under 35 U.S.C. 154(b) by 227 days.

(21) Appl. No.: 18/810,477

(22) Filed: Aug. 20, 2024

(65) Prior Publication Data

US 2024/0411102 A1 Dec. 12, 2024

Related U.S. Application Data

(63) Continuation of application No. PCT/JP2022/034340, filed on Sep. 14, 2022, and a (Continued)

(51) Int. Cl.
*G02B 7/08* (2021.01)
*G02B 27/64* (2006.01)

(52) U.S. Cl.
CPC ............. *G02B 7/08* (2013.01); *G02B 27/646* (2013.01)

(58) Field of Classification Search
CPC .......... G02B 7/08; G02B 27/646; G02B 7/04; G03B 5/00
See application file for complete search history.

(56) References Cited

U.S. PATENT DOCUMENTS

| | | | |
|---|---|---|---|
| 7,589,920 | B2 | 9/2009 | Shin |
| 2008/0079813 | A1 | 4/2008 | Suzuki |

(Continued)

FOREIGN PATENT DOCUMENTS

| | | | |
|---|---|---|---|
| CN | 112987223 A | | 6/2021 |
| CN | 113126232 A | | 7/2021 |

(Continued)

OTHER PUBLICATIONS

International Search Report and Written Opinion (ISA/237) of the International Search Authority for International Patent Application No. PCT/JP2022/006975, mailed by the Japan Patent Office on May 10, 2022.

(Continued)

*Primary Examiner* — Charles S Chang

(57) ABSTRACT

An optical driving apparatus, including: a fixed member; a driven member that is movable with respect to the fixed member; and a guiding member that restricts the driven member from moving in a predetermined direction with respect to the fixed member, wherein the guiding member has: a first groove in a V-shaped cross-sectional shape, which is formed on any one of the fixed member or the driven member; a first convex portion fitting into the first groove, which is formed on another of the fixed member or the driven member; and a plurality of microspheres interposed in a gap between the first groove and the first convex portion and disposed in a longitudinal direction of the first groove and in a direction perpendicular to the longitudinal direction to generate rolling friction.

14 Claims, 35 Drawing Sheets

100

Related U.S. Application Data continuation of application No. PCT/JP2022/006975, filed on Feb. 21, 2022, said application No. PCT/JP2022/034340 is a continuation of application No. PCT/JP2022/006975, filed on Feb. 21, 2022.

(56) References Cited

U.S. PATENT DOCUMENTS

| | | | | |
|---|---|---|---|---|
| 2012/0190275 | A1 | 7/2012 | Aeschlimann | |
| 2021/0373278 | A1 | 12/2021 | Kim | |
| 2023/0341650 | A1 * | 10/2023 | Park | G02B 7/09 |

FOREIGN PATENT DOCUMENTS

| | | | |
|---|---|---|---|
| CN | 113900213 | A | 1/2022 |
| JP | 2008089804 | A | 4/2008 |
| JP | 2008225349 | A | 9/2008 |
| JP | 2012029495 | A | 2/2012 |
| JP | 2012152892 | A | 8/2012 |
| JP | 2018180353 | A | 11/2018 |
| JP | 2021012235 | A | 2/2021 |
| KR | 20200144349 | A | 12/2020 |

OTHER PUBLICATIONS

International Search Report and Written Opinion (ISA/237) of the International Search Authority for International Patent Application No. PCT/JP2022/034340, mailed by the Japan Patent Office on Nov. 29, 2022.

* cited by examiner

200

SECTIONAL VIEW TAKEN ALONG LINE A-A

SECTIONAL VIEW TAKEN ALONG LINE B-B

SECTIONAL VIEW TAKEN ALONG LINE C-C

OPTICAL DRIVING APPARATUS

The contents of the following patent application(s) are incorporated herein by reference:

NO. PCT/JP2022/006975 filed in WO on Feb. 21, 2022
NO. PCT/JP2022/034340 filed in WO on Sep. 14, 2022

BACKGROUND

1. Technical Field

The present invention relates to an optical driving apparatus.

2. Related Art

In a configuration that moves an image capturing element for image stabilization, it is disclosed that a drive shaft is driven by reciprocating movement of the drive shaft by expansion and contraction of a piezoelectric element (for example, Patent Document 1). A configuration is disclosed in which a fluid lubricant is used on sliding surfaces in an apparatus with a mobile carriage and linear guide (for example, Patent Document 2).

PRIOR ART DOCUMENT

Patent Document

Patent Document 1: Japanese Patent Application Publication No. 2008-225349.
Patent Document 2: Japanese Patent Application Publication No. 2012-152892.

GENERAL DISCLOSURE

An aspect of the present invention provides an optical driving apparatus. An optical driving apparatus, including: a fixed member; a driven member that is movable with respect to the fixed member; and a guiding member that restricts the driven member from moving in a predetermined direction with respect to the fixed member, wherein the guiding member has: a first groove in a V-shaped cross-sectional shape, which is formed on any one of the fixed member or the driven member; a first convex portion fitting into the first groove, which is formed on another of the fixed member or the driven member; and a plurality of microspheres interposed in a gap between the first groove and the first convex portion and disposed in a longitudinal direction of the first groove and in a direction perpendicular to the longitudinal direction to generate rolling friction. The optical driving apparatus may further have a magnetic body provided on any one of the fixed member or the driven member to attract the fixed member and the driven member.

The guiding member may further have a second groove in a flat cross-sectional shape, which is formed on any one of the fixed member and the driven member; a second convex portion fitting into the second groove, which is formed on another of the fixed member and the driven member; and a plurality of microspheres interposed in a gap between the second groove and the second convex portion and disposed in a longitudinal direction of the second groove and in a direction perpendicular to the longitudinal direction to generate rolling friction.

The guiding member may further have a second groove in a V-shaped cross-sectional shape, which is formed on any one of the fixed member and the driven member; a second convex portion fitting into the second groove, which is formed on another of the fixed member and the driven member; and a plurality of microspheres interposed in a gap between the second groove and the second convex portion and disposed in a longitudinal direction of the second groove and in a direction perpendicular to the longitudinal direction to generate rolling friction.

The magnetic body may be provided between a set of the first groove and the first convex portion and a set of the second groove and the second convex portion.

A relationship of an attraction force of the magnetic body (M), a weight of the driven member (m), a distance between a reference point of the guiding member and a center of the magnetic body (D1), and a distance between the reference point of the guiding member and a center of gravity of the driven member (D2) may be $M>1.5\ m\times D2/D1$.

a gel containing the microspheres may be applied to a surface forming the first groove and a gel housing portion is provided therein to prevent diffusion of the microspheres.

An inclined portion may be provided at an edge of the surface forming the first convex portion to guide the microspheres into the gap.

The driven member may be driven by a SIDM (Smooth Impact Drive Mechanism: registered trademark).

The driven member may be driven by a VCM (Voice Coil Motor).

The driven member may be driven by an SMA (Shape Memory Alloy).

A plurality of the driven members may be provided, and the plurality of driven members may be driven independently of each other.

The microspheres may be non-magnetic bodies.

Note that the summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to claims. In addition, some combinations of features explained in the embodiments may be unnecessary for the solving means of the invention.

Configuration of First Embodiment

Figure 1:
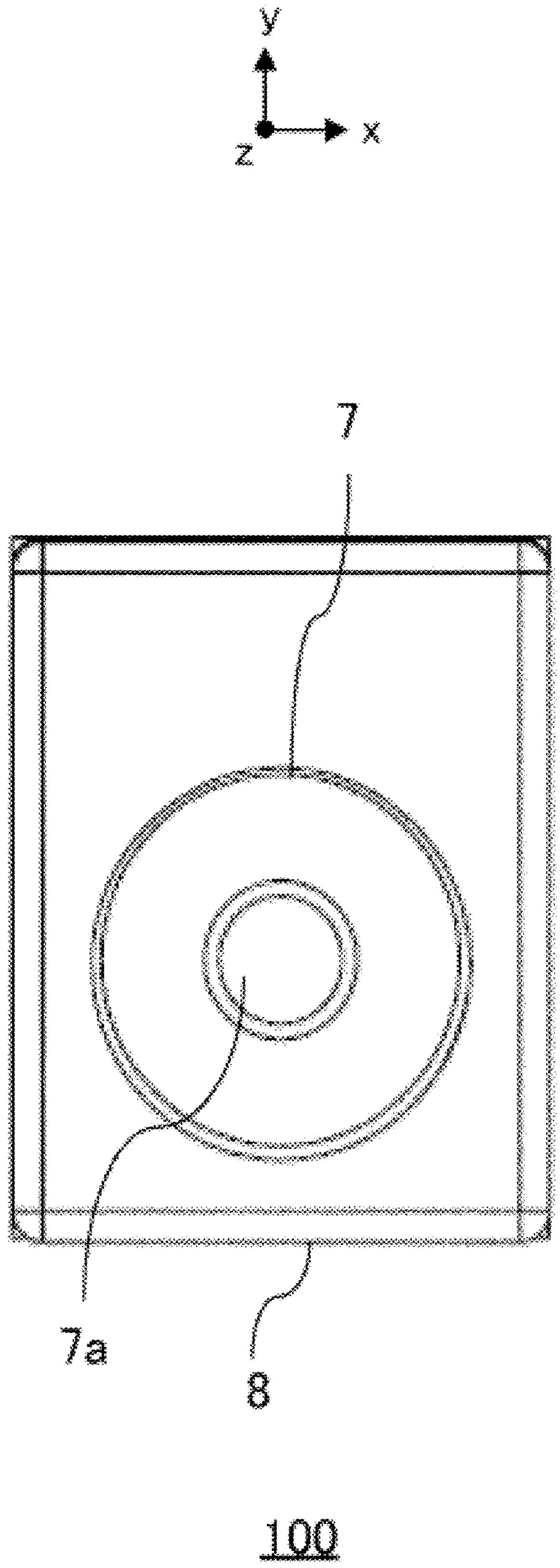
FIG. 1 is a front view showing a schematic configuration of an optical driving apparatus 100 in a first embodiment.
Figure 2:
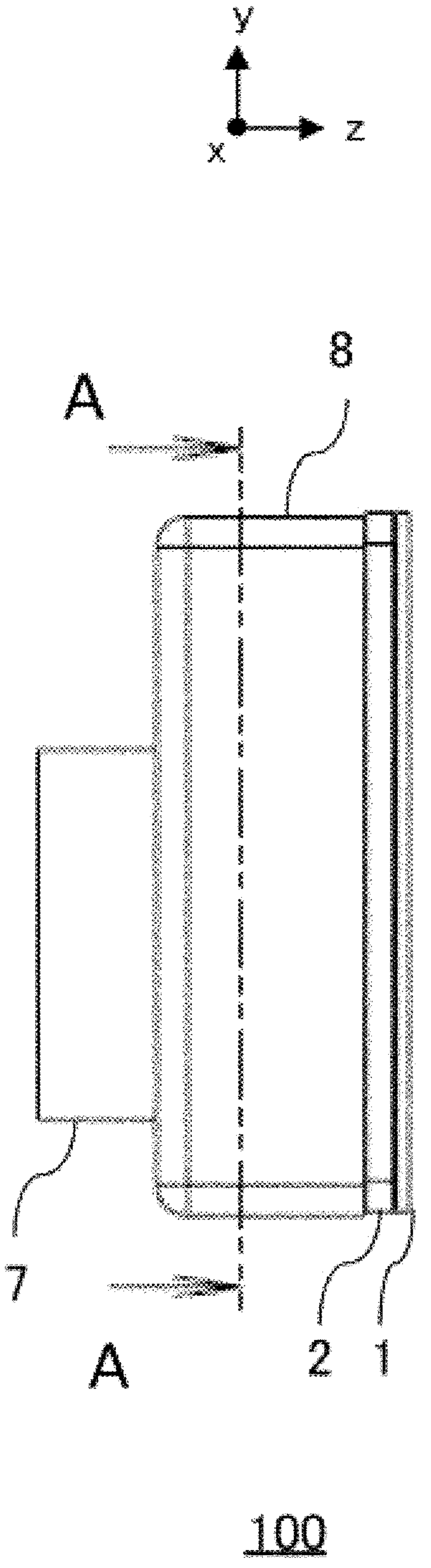
FIG. 2 is a side view showing the schematic configuration of the optical driving apparatus 100 in the first embodiment.
Figure 3:
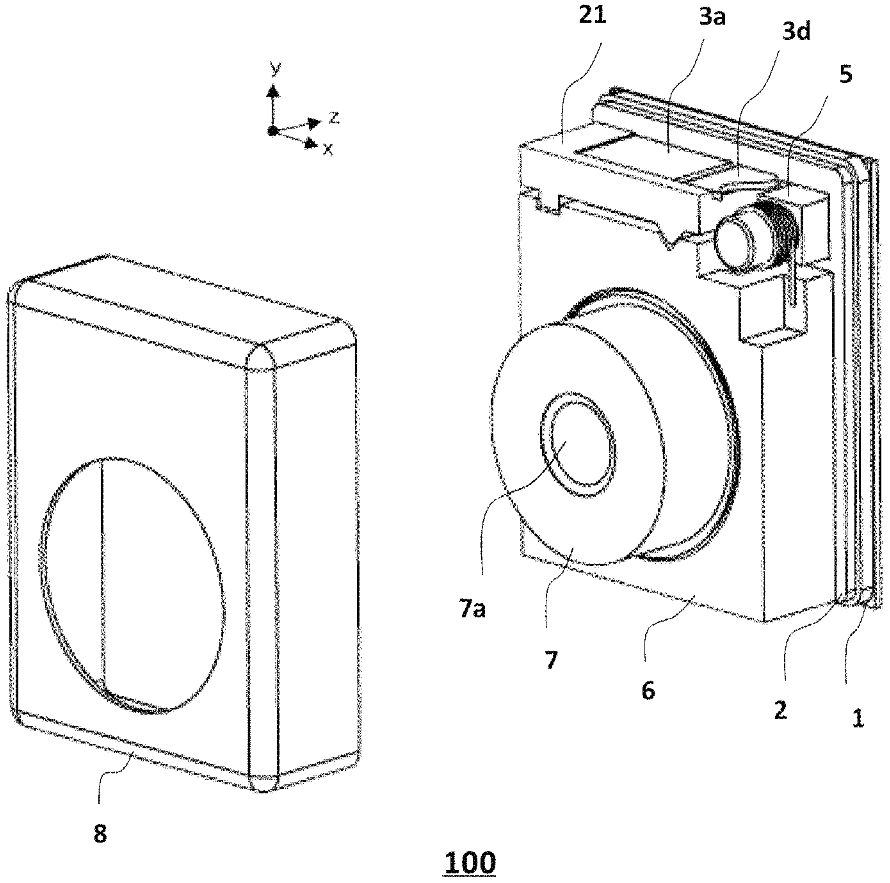
FIG. 3 is a perspective view showing that a cover of the optical driving apparatus 100 is removed in the first embodiment.

FIG. 1 is a front view showing a schematic configuration of an optical driving apparatus 100 in a first embodiment, FIG. 2 is a side view showing the schematic configuration of the optical driving apparatus 100 in the first embodiment, and FIG. 3 is a perspective view showing that a cover 8 of the optical driving apparatus 100 is removed in the first embodiment. The optical driving apparatus 100 shown in FIG. 1 to FIG. 3 is used by being incorporated in an apparatus, for example, an image capturing apparatus, which performs auto-focusing by moving a lens 7*a* in an optical axis direction with respect to a fixed frame 2. An xyz coordinate system is shown in FIG. 1 to FIG. 3. An xy direction is a direction perpendicular to the optical axis direction of the lens 7*a* of the optical driving apparatus 100, and a z direction is a predetermined direction that is the optical axis direction of the lens 7*a* of the optical driving apparatus 100.

Figure 4:
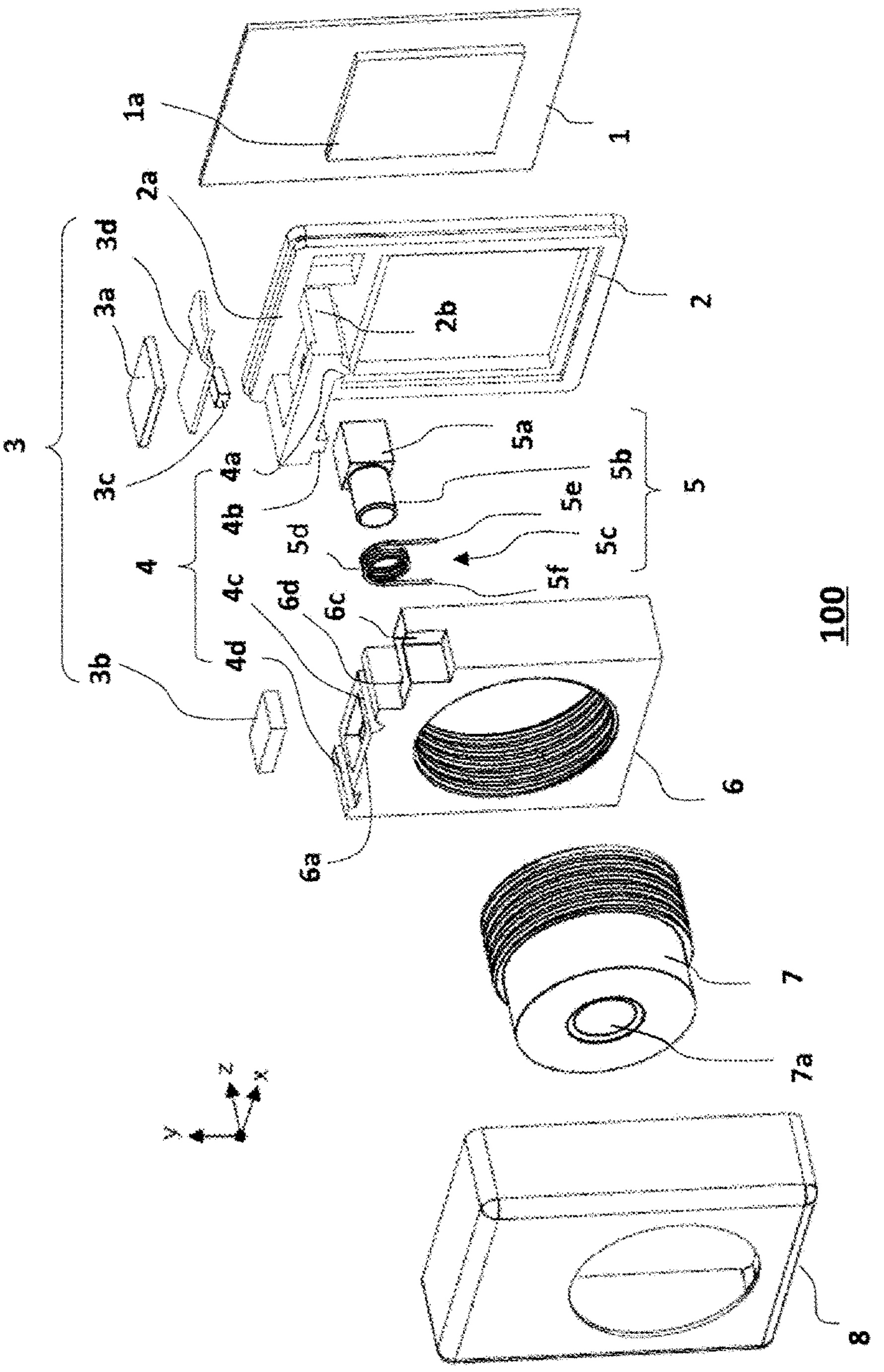
FIG. 4 is an exploded perspective view showing the schematic configuration of the optical driving apparatus 100 in the first embodiment.

FIG. 4 is an exploded perspective view showing the schematic configuration of the optical driving apparatus 100 in the first embodiment. As shown in FIG. 4, the optical driving apparatus 100 includes a sensor board 1, a fixed frame 2 as a fixed member, a detecting unit 3, a guiding member 4, a driving unit 5, a lens frame 6 as a driven member, a lens holder 7 and a cover 8.

The sensor board 1 with an image sensor 1*a* is fixed on the fixed frame 2. The image sensor 1*a* is an image sensor such as, for example, a CCD (Charge Coupled Device) or a CMOS (Complementary Metal Oxide Semiconductor). The fixed frame 2 is in an abbreviated rectangular shape with 4 sides. A supporting member 2*b* that movably supports the lens frame 6 is formed on an upper side 2*a* of the fixed frame 2. A first convex portion 4*a* and a second convex portion 4*b* of the guiding member 4 are formed in the supporting member 2*b*. A reinforcing plate 3*a* of the detecting unit 3 is provided on an upper surface of the supporting member 2*b*.

The detecting unit 3 is a detecting apparatus composed of the reinforcing plate 3*a*, a detecting magnet 3*b* provided in the lens frame 6 and an FPC (Flexible printed circuits) board 3*d* equipped with a hall element 3*c*, provided in the supporting member 2*b*. The detecting magnet 3*b* is provided on an upper side 6*a* of the lens frame 6. The hall element 3*c* is provided on a detecting surface of the supporting member 2*b* facing the detecting magnet 3*b*. The hall element 3*c* provided in the supporting member 2*b* detects a magnetic field of the detecting magnet 3*b* provided in the lens frame 6, and detects a relative position with respect to the fixed frame 2 of the lens frame 6 in the optical axis direction of the lens 7*a*. The reinforcing plate 3*a* equipped with the hall element 3*c* is composed of a magnetic body, and the lens frame 6 is attracted toward the fixed frame 2 in the y direction by the reinforcing plate 3*a* and the detecting magnet 3*b* attracting each other with a magnetic force. Accordingly, a free separation between the fixed frame 2 and the lens frame 6 is prevented.

The guiding member 4 is composed of a first convex portion 4*a* and a second convex portion 4*b* provided in the supporting member 2*b*, and a first groove 4*c* and a second groove 4*d* provided in the lens frame 6. The guiding member 4 is provided on the same side (the side 2*a* and the side 6*a*) as the detecting unit 3. The guiding member 4 guides the lens frame 6 in the optical axis direction of the lens 7*a*, which is a predetermined direction.

The driving unit 5 is composed of an electromechanical converting element 5*a* attached to a not shown driving circuit board firmly fixed on the fixed frame 2, a drive shaft 5*b* and a coil spring 5*c* as a transmission member. The electromechanical converting element 5*a* is connected to a not shown driving circuit, expands and contracts by turning the voltage ON and OFF, and the speed of its expansion and contraction is adjustable. The electromechanical converting element 5*a* is connected to the drive shaft 5*b*, and drives the coil spring 5*c*, which is frictionally engaged with the drive shaft 5*b*, in an axial direction of the drive shaft 5*b*. The axial direction of the drive shaft 5*b* is preferably parallel to the optical axis direction of the lens 7*a*, but there may be misalignment.

The electromechanical converting element 5*a* is a stacked piezoelectric element consisting of a plurality of piezoelectric materials made of piezoelectric ceramics alternately stacked with internal electrodes. The electromechanical converting element 5*a* is, for example, a SIDM (Smooth Impact Drive Mechanism: registered trademark). The drive shaft 5*b* is a rod-shaped member bonded with adhesive to one end of the electromechanical converting element 5*a* in the direction of expansion and contraction. The electromechanical converting element 5*a* and the drive shaft 5*b* are firmly fixed by adhesion.

The drive shaft 5*b* is press-fitted into the coil spring 5*c*. The inner diameter of the coil spring 5*c* is smaller than the outer diameter of the drive shaft 5*b*, and when the drive shaft 5*b* is press-fitted into the coil spring 5*c*, the coil spring 5*c*, which is an elastic body, expands in diameter and the coil spring 5*c* and the drive shaft 5*b* engage in friction. The coil spring 5*c* has a coil portion 5*d* and two arm portions 5*e* and 5*f*. The arm portion 5*e* on the fixed frame 2 side of the coil spring 5*c* contacts a contacting portion 6*c* provided on the lens frame 6. The arm portion 5*f* on the lens frame 6 side of the coil spring 5*c* contacts a contacting portion 6*d* provided on the lens frame 6. Each of the arm portions 5*e*, 5*f* and the corresponding contacting portions 6*c*, 6*d* are preferably slidable in a direction perpendicular to the optical axis direction.

The two arm portions 5*e* and 5*f* of the coil spring 5*c* elastically press the two contact points of the contacting portions 6*c* and 6*d* provided on the lens frame 6 in the direction of pushing them out, thereby transmitting the driving force in the ±z direction that has been transmitted to the drive shaft 5*b* to the lens frame 6. More precisely, the arm portion 5*e* on the fixed frame 2 side of the coil spring 5*c* drives the lens frame 6 in the +z direction (firmly fixed side), and the arm portion 5*f* on the lens frame 6 side of the coil spring 5*c* drives the lens frame 6 in the −z direction (shaft end side). This causes the lens frame 6 to move in the optical axis direction (±z direction) of the lens 7*a*. The lens frame 6 may be configured to move in a direction (xy direction) perpendicular to the optical axis of the lens.

As described above, the driving force from the driving unit 5 is transmitted by the coil spring 5*c*, thereby the coil spring 5*c* and the lens frame 6 move integrally. The distance between the point of action of the arm portions 5*e* and 5*f* of the coil spring 5*c* on the lens frame 6 that is the driven member, and the wound outer circumferential portion of the coil portion 5*d* is preferably equal to or less than six times the wire diameter of the coil spring 5*c*. This allows suppression of elastic deformation of the arm portions 5*e* and 5*f* during drive to increase transmission efficiency, and suppression of elastic deformation of the arm portions 5*e* and 5*f* when subjected to external shock.

By configuring the transmission member with the coil spring 5*c* having elasticity, the rattling that may occur when transmitting the driving force from the driving unit 5 to the lens frame 6 can be reduced. The space for members in the periphery of the drive shaft 5*b* in the driving unit 5 can be reduced by configuring the transmission member with the coil spring 5*c*. By configuring the transmission member with the coil spring 5*c*, the contact point between the drive shaft 5*b* and the transmission member is spiraled to distribute the pressure, thereby being able to reduce wear on the drive shaft 5*b*.

The lens frame 6 is the driven member driven by the driving unit 5, and is movable relative to the fixed frame 2. The lens holder 7 that holds the lens 7*a* is inserted and screwed into the lens frame 6. The lens frame 6 moves in the optical axis direction of the lens 7*a* inside the cover 8. The lens frame 6 is molded into an abbreviated rectangular shape by using resin as an example. The first groove 4*c* and the second groove 4*d* of the guiding member 4 are formed on the upper side 6*a* of the lens frame 6.

The first groove 4*c* is a first groove with a V-shaped cross-sectional shape. The first groove 4*c* is provided in a position facing the first convex portion 4*a* provided in the supporting member 2*b* of the fixed frame 2. The first convex portion 4*a* is a first convex portion in a V-shaped cross-sectional shape. The second groove 4*d* is a second groove in a flat cross-sectional shape. The second groove 4*d* is provided in a position facing the second convex portion 4*b*. The second convex portion 4*b* is a second convex portion in a flat cross-sectional shape. The detecting magnet 3*b* of the detecting unit 3 is provided on the upper side 6*a* of the lens frame 6.

Figure 5:
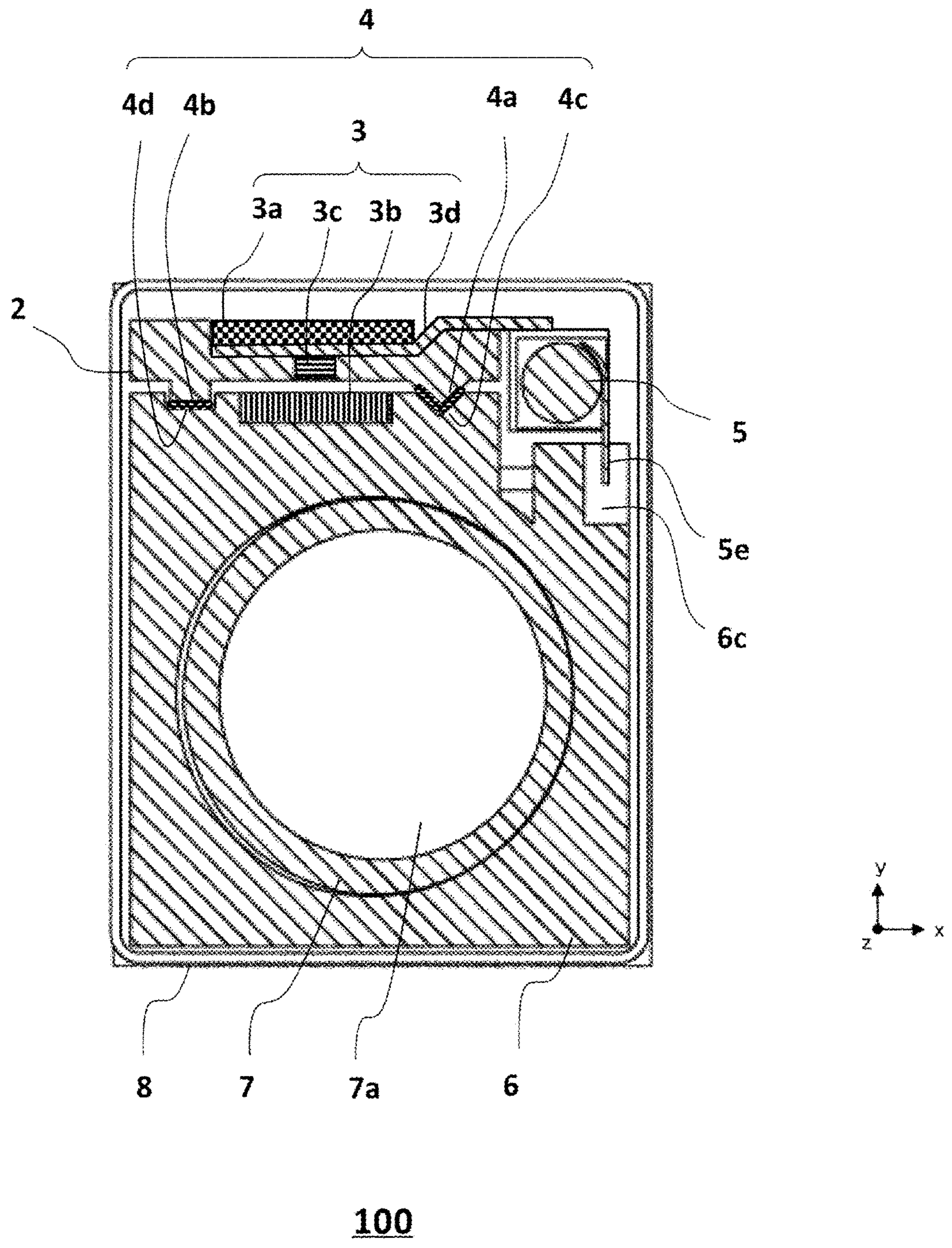
FIG. 5 is a sectional view taken along line A-A of FIG. 2.

FIG. 5 shows a sectional view taken along line A-A of FIG. 2. FIG. 5 shows the optical driving apparatus 100 viewed from the optical axis direction of the lens 7*a*. As shown in FIG. 5, two guiding members 4 are provided on the upper side of the optical driving apparatus 100 with the abbreviated rectangular shape, FPC board 3*d*, reinforcing plate 3*a*, detecting magnet 3*b* and hall element 3*c* that compose the detecting unit 3 are on the same side as the guiding member 4, and are provided between a set of the first convex portion 4*a* and the first groove 4*c* and a set of the second convex portion 4*b* and the second groove 4*d*. The driving unit 5 is provided separated from the guiding member 4 on the same side as the guiding member 4 on the +x direction side.

Figure 6:
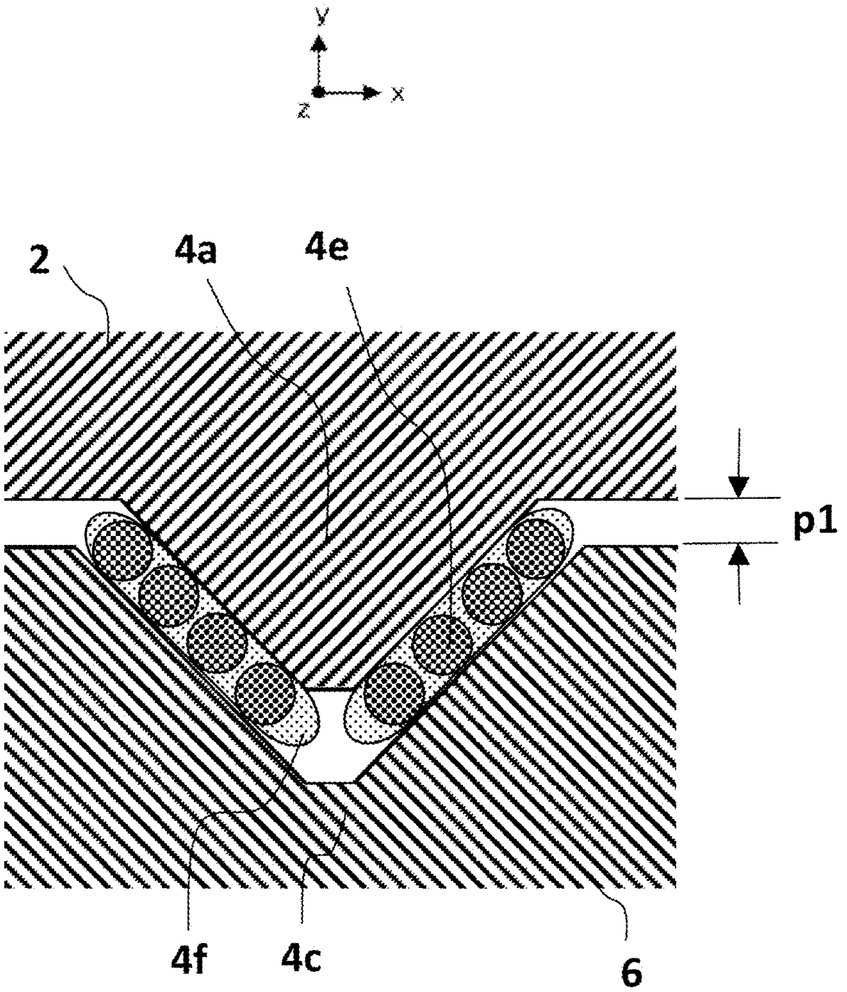
FIG. 6 shows a detailed configuration of a guiding member 4 in the first embodiment.
Figure 7:
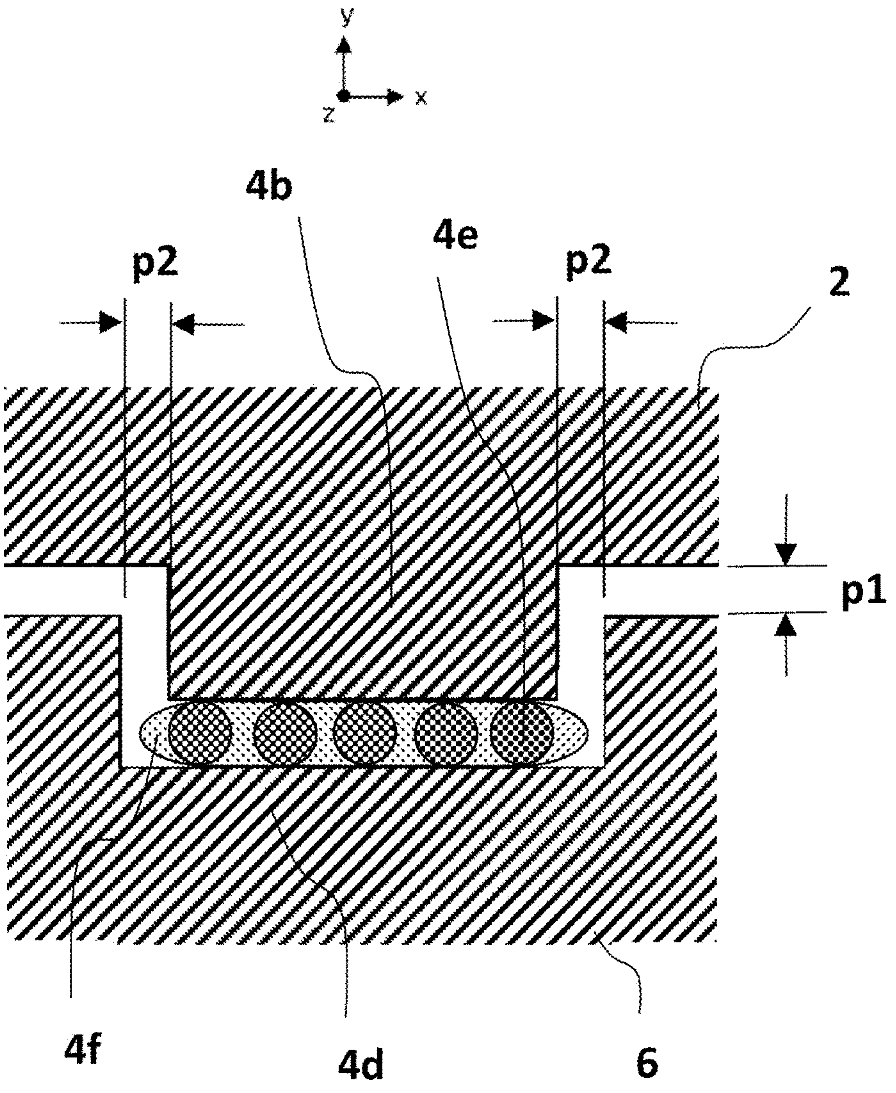
FIG. 7 shows the detailed configuration of the guiding member 4 in the first embodiment.

FIG. 6 and FIG. 7 show detailed configurations of the guiding member 4 in the first embodiment. FIG. 6 shows a cross-sectional shape of the first convex portion 4*a* and the first groove 4*c* side of the guiding member 4, and FIG. 7 shows a cross-sectional shape of the second convex portion 4*b* and second groove 4*d* side of the guiding member 4, when viewed from the optical axis direction of the lens 7*a*. The guiding member 4 is provided on the same side as the detecting unit 3 (the side 2*a* and the side 6*a*). As shown in FIG. 5 to FIG. 7, the guiding member 4 is composed of the first convex portion 4*a* and the second convex portion 4*b* formed on the supporting member 2*b* of the fixed frame 2, the first groove 4*c* and the second groove 4*d* formed on the lens frame 6, and a gel 4*f* containing a plurality of microspheres (micropearl: registered trademark) 4*e* (also merely referred to as a "gel containing microspheres" below). The microspheres 4*e* are composed of non-magnetic bodies so that they are not affected by the detecting magnet 3*b*. The microspheres 4*e*, for example, are desirably made of resin or ceramic.

For convenience of explanation, the diameter of the plurality of microspheres 4*e* is depicted as large in FIGS. 6 and 7, but the diameter of the plurality of microspheres 4*e* may be from ϕ0.01 to ϕ0.15 (mm). In the optical driving apparatus employed in this application, it is not practical to use a sphere with a diameter smaller than ϕ0.01 mm considering the surface roughness and flatness of the convex portion or groove where the microspheres 4*e* roll, and using a sphere larger than ϕ0.15 mm is not preferable in order to miniaturize the apparatus.

As shown in FIG. 6, the first convex portion 4*a* and the first groove 4*c* have a V-shape when viewed from the optical axis direction of the lens 7*a*. An interspace p1 (gap) is formed with a predetermined thickness between the fixed frame 2 and the lens frame 6 in the y direction. The plurality of microspheres 4*e* interpose in the interspace p1 between the first convex portion 4*a* and the first groove 4*c*, and the plurality of microspheres 4*e* are distributed in a longitudinal direction (±z direction) of the first groove 4*c* and in a direction perpendicular to the longitudinal direction (xy direction). The plurality of microspheres 4*e* rotate while adhering to the first convex portion 4*a* and the first groove 4*c* without spaces in between.

As shown in FIG. 7, the second convex portion 4*b* and the second groove 4*d* have an abbreviated rectangular shape with a flat surface in the x direction when viewed from the optical axis direction of the lens 7*a*. The interspace p1 is formed with a predetermined thickness between the fixed frame 2 and the lens frame 6 in the y direction, and an interspace p2 (gap) is formed with a predetermined thickness in the x direction. The plurality of microspheres 4*e* interpose in the interspace p2 between the second convex portion 4*b* and the second groove 4*d*, and the plurality of microspheres 4*e* are distributed in a longitudinal direction (±z direction) of the second groove 4*d* and in a direction perpendicular to the longitudinal direction (±x direction). The plurality of microspheres 4*e* rotate while adhering to the second convex portion 4*b* and the flat surface of the second groove 4*d* without spaces in between.

According to this configuration, the lens frame 6 is crimped to the supporting member 2*b* of the fixed frame 2 via the gel 4*f* containing the plurality of microspheres 4*e* and is supported movable in the ±z direction. Because the plurality of microspheres 4*e* each have the same diameter and roll in contact with the first convex portion 4*a* and the first groove 4*c*, and with the second convex portion 4*b* and the second groove 4*d*, the plurality of microspheres 4*e* keep constant distances between the first convex portion 4*a* and the first groove 4*c*, and between the second convex portion 4*b* and the second groove 4*d*, and the first groove 4*c* moves parallel to the first convex portion 4*a*, and the second groove 4*d* moves parallel to the second convex portion 4*b*. Accordingly, a constant distance is kept between the fixed frame 2 with the first convex portion 4*a* and the second convex portion 4*b* and the lens frame 6 with the first groove 4*c* and the second groove 4*d*, and the lens frame 6 moves parallel (±z direction) to the fixed frame 2.

This prevents the lens frame 6 from moving at an angle (in a direction other than the ±z direction) with respect to the light receiving surface of the image sensor 1*a*. Because the lens frame 6 is movably supported against the fixed frame 2 via the gel 4*f* containing the plurality of microspheres 4*e*, only driving resistance is generated by the rolling friction of the microspheres 4*e* when the lens frame 6 moves, and the lens frame 6 can move without a large resistance force. The convex portions 4*a* and 4*b* may be formed on the lens frame 6 and the grooves 4*c* and 4*d* may be formed on the fixed frame 2.

As shown in FIG. 5, the first convex portion 4*a* and the first groove 4*c* are V-shaped while the second convex portion 4*b* and the second groove 4*d* are rectangle-shaped with an interspace p2 in the x direction to prevent overconstrain in the x direction. The second convex portion 4*b* and the second groove 4*d* are convex and grooved to ensure that the contact surfaces of each other are set and to prevent diffusion of the gel 4*f*. However, the second groove 4*d* can be eliminated and the convex and planar portions may be used to contact each other after preventing diffusion of the gel 4*f* by other means, such as anti-diffusion agents.

By inserting the gel 4*f* containing the plurality of microspheres 4*e* having the same outer diameter between the first convex portion 4*a* and the first groove 4*c*, and between the second convex portion 4*b* and the second groove 4*d*, the thickness of the lubricating layer can be kept constant, and stabilization of the friction between the first convex portion 4*a* and the first groove 4*c* and between the second convex portion 4*b* and the second groove 4*d* can be realized. It becomes easier to maintain parallelism between the fixed frame 2 with the first convex portion 4*a* and the second convex portion 4*b* and the lens frame 6 with the first groove 4*c* and the second groove 4*d*. The gel 4*f* containing the plurality of microspheres only needs to be applied to the first groove 4*c* and the second groove 4*d*, or to the first convex portion 4*a* and the second convex portion 4*b* during installation, which simplifies handling and assembly compared to conventional ball guide mechanisms.

Figure 8:
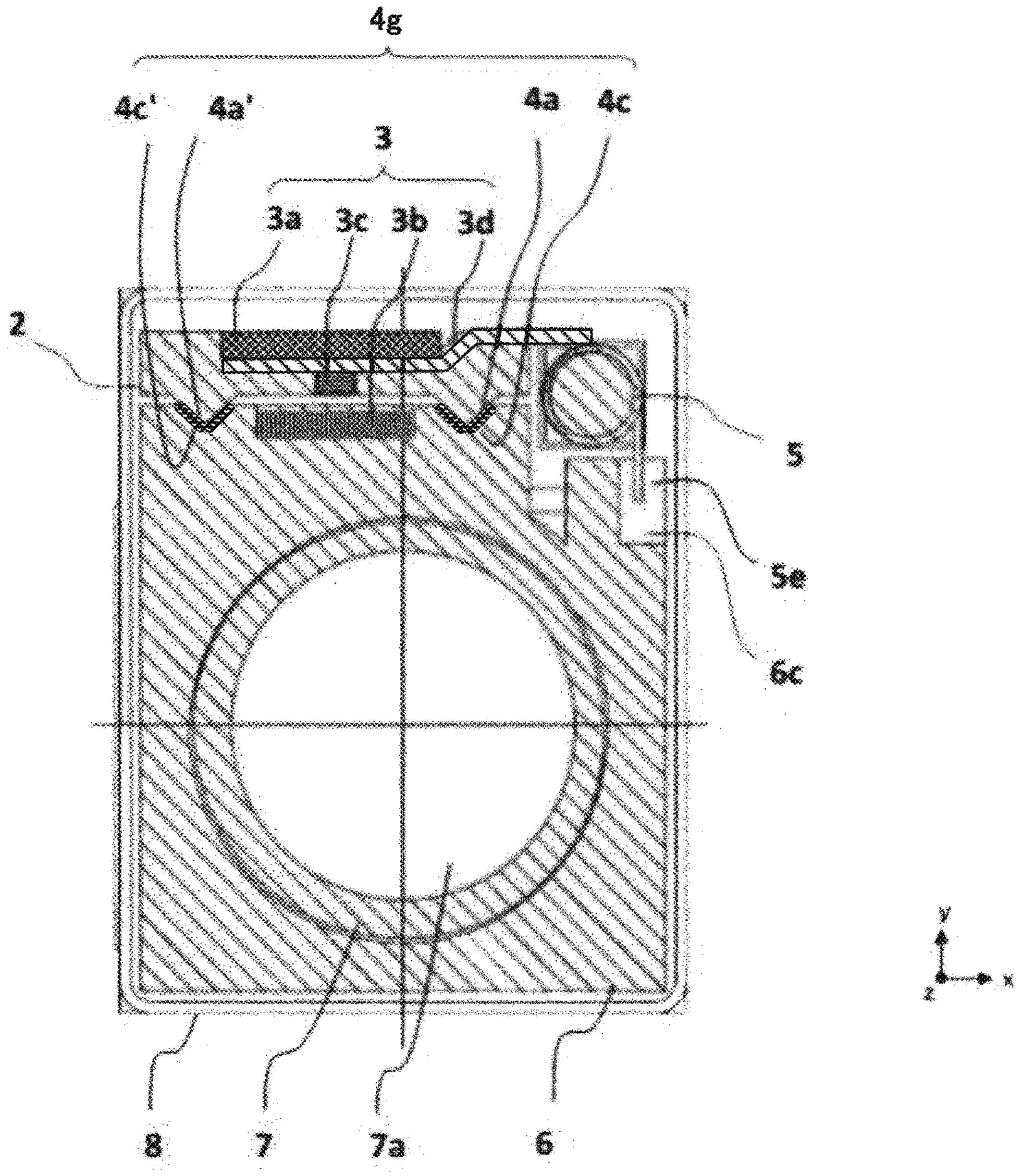
FIG. 8 shows a guiding member **4*g*** in another example.

FIG. 8 shows the guiding member 4*g* in another example. FIG. 8 shows another example of the cross-sectional view of the optical driving apparatus 100 when viewed from the optical axis direction of the lens 7*a*. As shown in FIG. 8, the guiding member 4*g* in another example has a set of a first convex portion 4*a* and a first groove 4*c* in a V-shape, and a set of a second convex portion 4*a*' and a second groove 4*c*' in a V-shape. The gel 4*f* containing the plurality of microspheres 4*e* is arranged between the first convex portion 4*a* and the first groove 4*c* in the V-shape, and between the second convex portion 4*a*' and the second groove 4*c*' in the V-shape. Such a configuration can be used when the constraint force of the lens frame 6 on the fixed frame 2 in the x direction needs to be strengthened.

Figure 9:
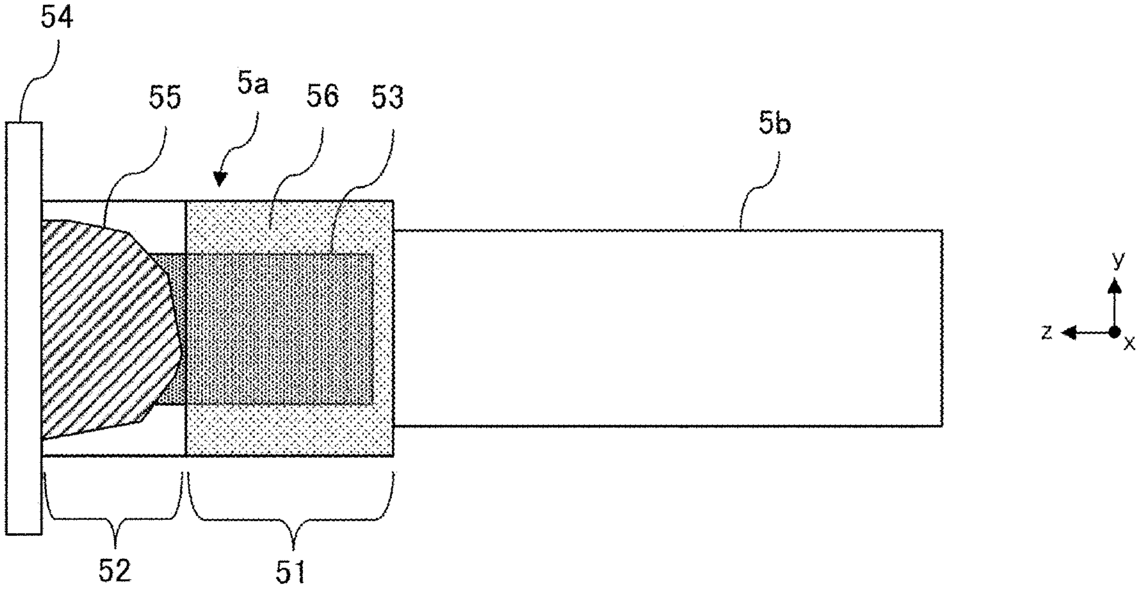
FIG. 9 is a side view showing a schematic configuration of an electromechanical converting element **5*a*** in the first embodiment.
Figure 10:
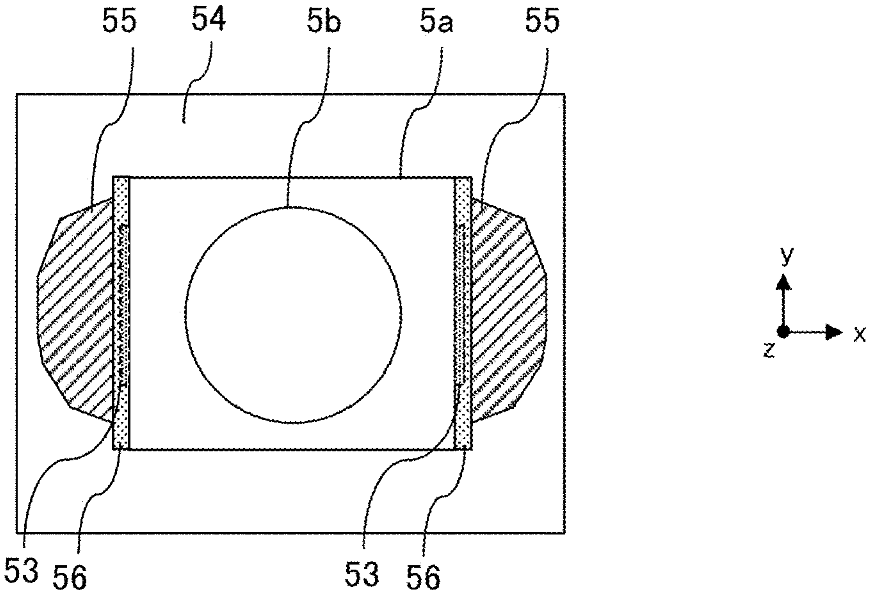
FIG. 10 is a front view showing the schematic configuration of the electromechanical converting element **5*a*** in the first embodiment.

FIG. 9 is a side view showing the schematic configuration of the electromechanical converting element 5*a* in the first embodiment, and FIG. 10 is a front view showing the schematic configuration of the electromechanical converting element 5*a* in the first embodiment. The electromechanical converting element 5*a* has a piezoelectric element portion 51 with an internal electrode and an inactive portion 52 without an internal electrode, and the piezoelectric element portion 51 and the inactive portion 52 are configured to be integral. In the piezoelectric element portion 51, the internal electrode has a comb electrode structure with a plurality of layers stacked on top of each other.

As shown in FIG. 9 and FIG. 10, external electrodes 53 are formed on both side surfaces of the electromechanical converting element 5*a*, spanning from the piezoelectric element portion 51 to the inactive portion 52. Further outside the external electrodes 53 on both side surfaces of the electromechanical converting element 5*a*, solder mounts 55 are formed to provide an electrical connection between the flexible board 54 and the electromechanical converting element 5*a*. The solder mounts 55 have a predetermined weight and, together with the inactive portion 52, contribute as a weight to the electromechanical converting element 5*a*.

As shown in FIG. 9 and FIG. 10, insulating layers 56 are provided in the upper portion of the piezoelectric element portions 51 of the external electrodes 53. This allows the solder mount 55 not to ride on the external electrode 53 of the piezoelectric element portion 51, thereby suppressing the destruction of the internal electrode due to solder heat.

Effects of First Embodiment

Effect 1

According to the optical driving apparatus 100 in the first embodiment, the lens frame 6, which is a driven member, is driven by the rolling of the microspheres 4*e* inside the gel 4*f*, thus being able to reduce the driving resistance of the lens frame 6 with respect to the fixed frame 2. In this manner, the driving unit 5 only needs to have enough driving force to move the weight of the lens frame 6, which is the driven member, and the driving unit 5 can be miniaturized, thus being able to reduce the overall size of the optical driving apparatus 100.

Effect 2

According to the optical driving apparatus 100 in the first embodiment, because the gel 4*f* containing the microspheres 4*e* only needs to be applied to the contacting portion, it is easier to handle and assemble compared to a configuration with a normal ball guide.

Effect 3

According to the optical driving apparatus 100 in the first embodiment, the space and weight occupied by the ball are no longer necessary compared to the conventional configuration with a ball guide, and the optical driving apparatus 100 can be made smaller and lighter. Accordingly, for example, when the optical driving apparatus 100 is mounted on a mobile terminal, it can meet the stringent thinness requirement of the mobile terminal.

Effect 4

In the conventional configuration with a ball guide, there has been a problem of causing imprints on the ball or apparatus due to impacts or the like. On the other hand, according to the optical driving apparatus 100 in the first embodiment, because the gel 4*f* containing the microspheres 4*e* is used, the impact force is distributed over a large number of microspheres 4*e* and imprints are less likely to occur.

Effect 5

In the conventional configuration with a ball guide, it has been necessary to provide a clearance corresponding to the size of the ball in the ball housing space in order to allow the ball to roll. On the other hand, according to the optical driving apparatus 100 in the first embodiment, because the microspheres 4*e* with a diameter smaller than the conventional ball are used, only an extremely small clearance dependent on the diameter of the microspheres 4*e* needs to be provided, allowing the optical driving apparatus 100 to be miniaturized.

Effect 6

In the conventional configuration with a ball guide, a housing end surface that prevents the ball from moving, or a retainer that fixes the ball position is required to prevent the ball from falling out. On the other hand, according to the optical driving apparatus 100 in the first embodiment, because the viscosity of gel 4*f* prevents the microspheres 4*e* from detaching, there is no necessity to include a physical structure body such as a housing end surface or a retainer, and the optical driving apparatus 100 is allowed to be miniaturized.

Effect 7

In the conventional configuration with a ball guide, the ball guide has a housing end surface to house the ball, so when the ball moves to a position where it adheres to the housing end surface due to impact or the like, the ball may not roll freely, resulting in poor movement. On the other hand, according to the optical driving apparatus 100 in the first embodiment, there is no necessity to provide a housing end surface, so the range over which the microspheres 4*e* roll can be widened, and the rolling movement of the microspheres 4*e* does not deteriorate.

Configuration of Second Embodiment

Figure 11:
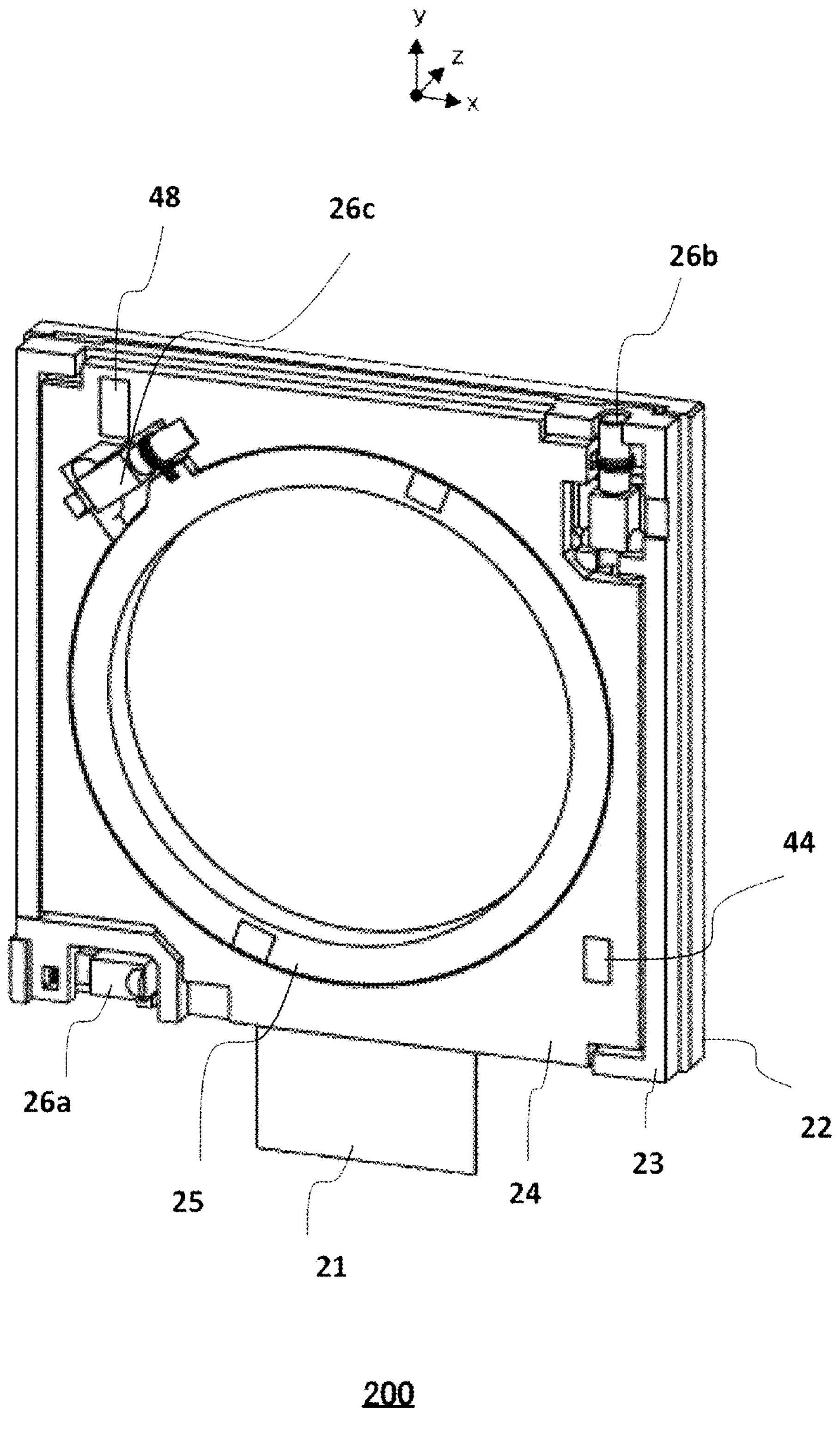
FIG. 11 is a perspective view showing a schematic configuration of an optical driving apparatus 200 in a second embodiment.

FIG. 11 is a perspective view showing a schematic configuration of an optical driving apparatus 200 in a second embodiment. The optical driving apparatus 200 in FIG. 11 is used by being incorporated in an apparatus, for example, in an image capturing apparatus, which performs image stabilization by translating and rotating an image sensor along a plane perpendicular to the optical axis of the lens. In the following description of the optical driving apparatus 200 in the second embodiment, duplicated descriptions are omitted for configurations identical or similar to the optical driving apparatus 100 in the first embodiment.

Figure 12:
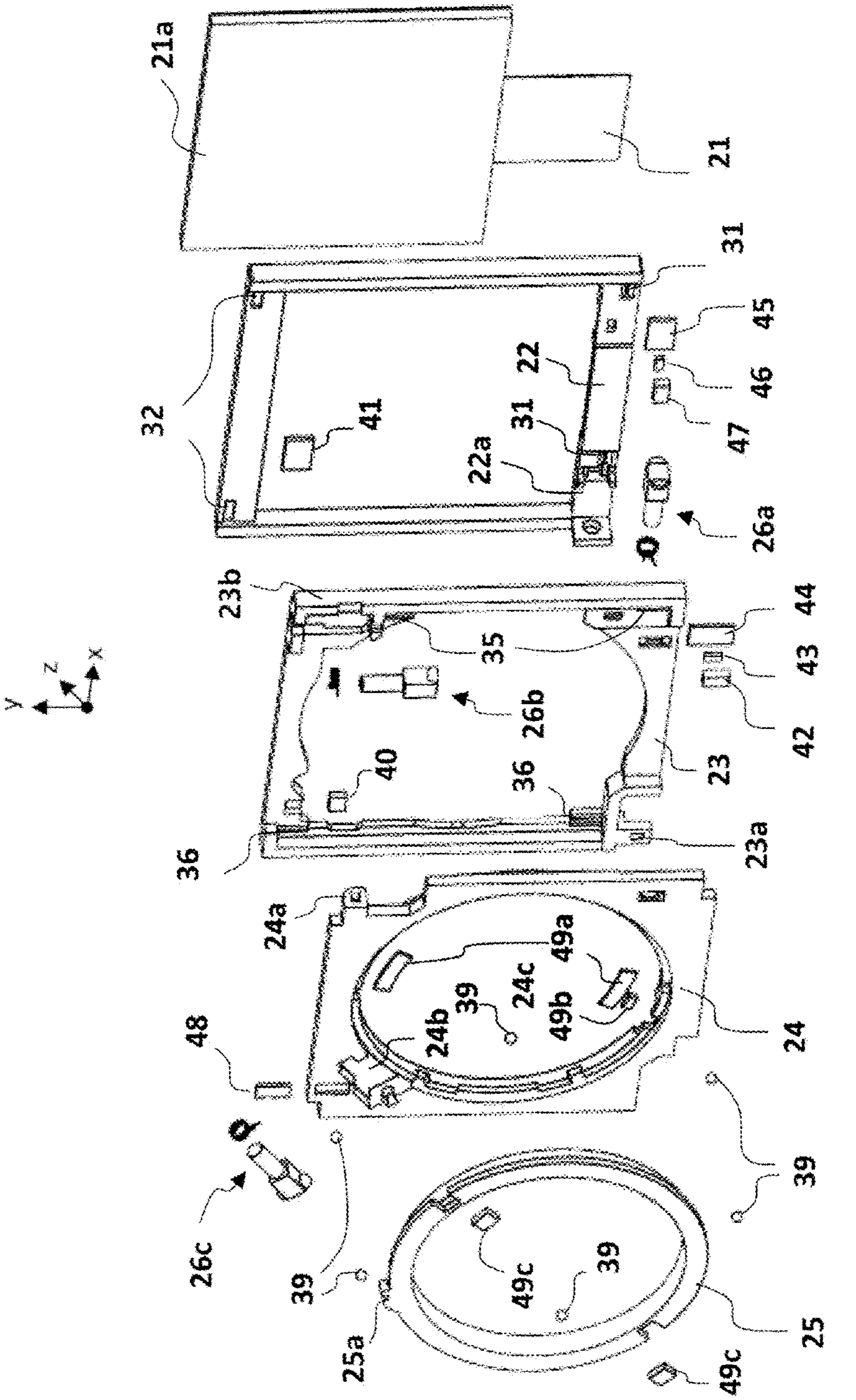
FIG. 12 is an exploded perspective view showing the schematic configuration of the optical driving apparatus 200 in the second embodiment.

FIG. 12 is an exploded perspective view showing the schematic configuration of the optical driving apparatus 200 in the second embodiment. As shown in FIG. 12, the optical driving apparatus 200 includes an image capturing sensor unit 21, a base frame 22, an x-direction moving frame 23, a y-direction moving frame 24 and a rotary frame 25. The optical driving apparatus 200 is stacked in an order of the base frame 22, the x-direction moving frame 23, the y-direction moving frame 24 and the rotary frame 25. FIG. 11 and FIG. 12 show an xyz coordinate system. The xy direction is the direction parallel to a light receiving surface of the image sensor of the optical driving apparatus 200, and the z direction is the direction perpendicular to the light receiving surface of the image sensor of the optical driving apparatus 200.

The optical driving apparatus 200 further has three driving units 26*a*, 26*b* and 26*c*. The driving unit 26*a* is a driving unit that translates the x-direction moving frame 23 in the ±x direction with respect to the base frame 22, the driving unit 26*b* is a driving unit that translates the y-direction moving frame 24 in the ±y direction with respect to the x-direction moving frame 23, and the driving unit 26*c* is a driving unit that rotates the rotary frame 25 along the xy plane with respect to the y-direction moving frame 24.

The three driving units 26*a*, 26*b* and 26*c* are respectively composed of an electromechanical converting element, a drive shaft and a coil spring. The operating principle of the three driving units 26*a*, 26*b* and 26*c* is the same as the operating principle of the driving unit 5 in the first embodiment.

The image capturing sensor unit 21 with an image sensor 21*a* is fixed on the rotary frame 25. A supporting member 22*a* that supports the driving unit 26*a* is formed in a lower left corner of the base frame 22. An electromechanical converting element of the driving unit 26*a* is firmly fixed on one end of the supporting member 22*a* on the +x direction side, and the driving unit 26*a* drives the x-direction moving frame 23 to translate with respect to the base frame 22 in the +x direction. In four corners on a surface facing the −z direction side of the base frame 22, two V-shaped groove portions 31 and two flat-shaped groove portions 32 are formed, with the gel containing the plurality of microspheres housed in each of four groove portions 31 and 32.

The x-direction moving frame 23 is a driven member driven by the driving unit 26*a*, and is movable with respect to the base frame 22, which is the fixed member, in the ±x direction. In the lower left corner of the x-direction moving frame 23, a contacting portion 23*a* is formed to be subject to a driving force from the driving unit 26*a* by contacting the coil spring of the driving unit 26*a*. A supporting member 23*b* that supports the driving unit 26*b* is formed in an upper right corner of the x-direction moving frame 23. An electromechanical converting element of the driving unit 26*b* is firmly fixed on one end of the supporting member 23*b* on the −y direction side, and the driving unit 26*b* drives the y-direction moving frame 24 to translate with respect to the x-direction moving frame 23 in the ±y direction.

In portions facing the four groove portions 31 and 32 of the base frame 22, of four corners on a surface facing the +z direction side of the x-direction moving frame 23, four convex portions (not illustrated) are formed with the gel containing the plurality of microspheres housed between the groove portions 31 and 32 of the base frame 22 and the four convex portions of the x-direction moving frame 23. Two convex portions among the four convex portions are convex portions in a V-shaped cross-sectional shape that fits the V-shaped groove portion 31, and the other two convex portions are convex portions in a flat cross-sectional shape that fits the flat-shaped groove portion 32. The V-shaped groove portions 31, the flat-shaped groove portions 32 and the four convex portions compose the guiding member in the second embodiment. The base frame 22 and the x-direction moving frame 23 are stacked having the plurality of microspheres clamped in between. In four corners on a surface facing the −z direction side of the x-direction moving frame 23, two V-shaped groove portions 35 and two flat-shaped groove portions 36 are formed, with the gel containing the plurality of microspheres housed in each of four groove portions 35 and 36.

The y-direction moving frame 24 is a driven member driven by the driving unit 26*b*, and is movable with respect to the x-direction moving frame 23 in the ±y direction. In the upper right corner of the y-direction moving frame 24, a contacting portion 24*a* is formed to be subject to a driving force from the driving unit 26*b* by contacting the coil spring of the driving unit 26*b*. A supporting member 24*b* that supports the driving unit 26*c* is formed in an upper left portion of the y-direction moving frame 24. An electromechanical converting element of the driving unit 26*c* is firmly fixed on one end of the supporting member 24*b* on the −x direction side, and the driving unit 26*c* drives the rotary frame 25 to rotate with respect to the y-direction moving frame 24 along the xy plane.

In portions facing the four groove portions 35 and 36 of the x-direction moving frame 23, of the four corners on a surface facing the +z direction side of the y-direction moving frame 24, two convex portions 37 and two convex portions 38 (see FIG. 17 and FIG. 18) are formed, respectively with the gel containing the plurality of microspheres housed between a set of the two groove portions 35 and the two groove portions 36 of the x-direction moving frame 23 and a set of the two convex portions 37 and the two convex portions 38 of the y-direction moving frame 24. That is, the x-direction moving frame 23 and the y-direction moving frame 24 are stacked having the plurality of microspheres clamped in between. The groove portion 35 is a first groove portion in a V-shaped cross-sectional shape, and the convex portion 37 is a first convex portion in a V-shaped cross-sectional shape. The groove portion 36 is a second groove portion in a flat cross-sectional shape, and the convex portion 38 is a second convex portion in a flat cross-sectional shape. The groove portions 35, the groove portions 36, the convex portions 37 and the convex portions 38 compose the guiding member in the second embodiment.

The y-direction moving frame 24 has a circular hole portion 24*c* in the center, and the inner diameter of the hole portion 24*c* is larger than the outer contour of the rotary frame 25. The rotary frame 25 is housed via six balls 39 in the hole portion 24*c* of the y-direction moving frame 24. That is, the y-direction moving frame 24 and the rotary frame 25 are stacked having the balls 39 clamped in between.

The rotary frame 25 is a driven member driven by the driving unit 26*c*, rotatably configured along the xy plane with respect to the y-direction moving frame 24. In the upper portion of the rotary frame 25, the contacting portion 25*a* is formed to be subject to a rotating driving force from the driving unit 26*c* by contacting the coil spring of the driving unit 26*c*.

As described above, the x-direction moving frame 23 is configured to be movable with respect to the base frame 22 in the +x direction, the y-direction moving frame 24 is configured to be movable with respect to the x-direction moving frame 23 in the ±y direction, and the rotary frame 25 is configured to be rotatable with respect to the y-direction moving frame 24 in the direction parallel to the xy plane. Accordingly, the rotary frame 25 is movable in the ±x direction and ±y direction and rotatable along the xy plane with respect to the base frame 22.

As shown in FIG. 12, the optical driving apparatus 200 further includes a plate 44 made of metallic magnetic, a detecting magnet 42 and a hall element 43. The detecting magnet 42 is fixed on the y-direction moving frame 24. The hall element 43 is arranged to face the detecting magnet 42, and fixed on the x-direction moving frame 23 together with the plate 44.

As shown in FIG. 12, the optical driving apparatus 200 further includes a plate 45 made of metallic magnetic, a detecting magnet 47 and a hall element 46. The detecting magnet 47 is fixed on the x-direction moving frame 23. The hall element 46 is arranged to face the detecting magnet 47, and fixed on the base frame 22 together with the plate 45.

As shown in FIG. 12, the optical driving apparatus 200 further has a plate 41 and a plate 48 made of metallic magnetic, and a magnet 40. As shown in FIG. 12, the magnet 40 is fixed on the x-direction moving frame 23 in a position diagonal across the optical axis from the positions where the detecting magnet 42 and the detecting magnet 47 are arranged. The plate 41 is arranged in the base frame 22 facing the magnet 40, and the plate 48 is arranged in the y-direction moving frame 24 facing the magnet 40.

Figure 13:
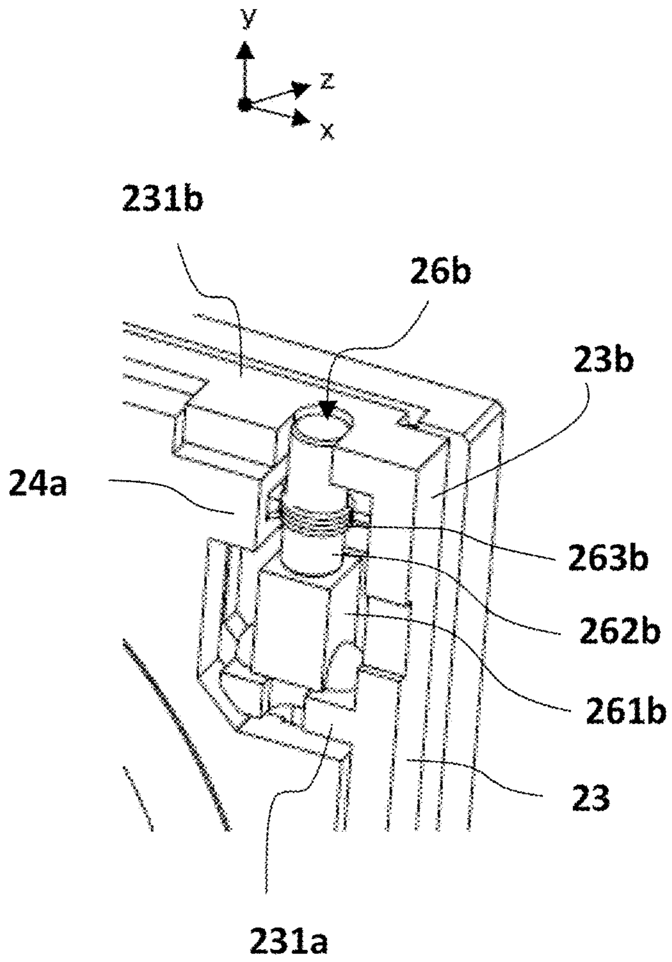
FIG. 13 is a perspective view showing a schematic configuration of a periphery of a driving unit 26*b* in the second embodiment.

The following explanation is given for the driving unit 26*b* on behalf of the three driving units 26*a*, 26*b* and 26*c*, and for the other drive units 26*a* and 26*c*, some duplicated explanations from the driving unit 26*b* are omitted. FIG. 13 is a perspective view showing a schematic configuration of a periphery of the driving unit 26*b* in the second embodiment, FIG. 14 is an exploded perspective view showing the schematic configuration of the periphery of the driving unit 26*b* in the second embodiment, and FIG. 15 is a front view showing the schematic configuration of the periphery of the driving unit 26*b* in the second embodiment.

Figure 14:
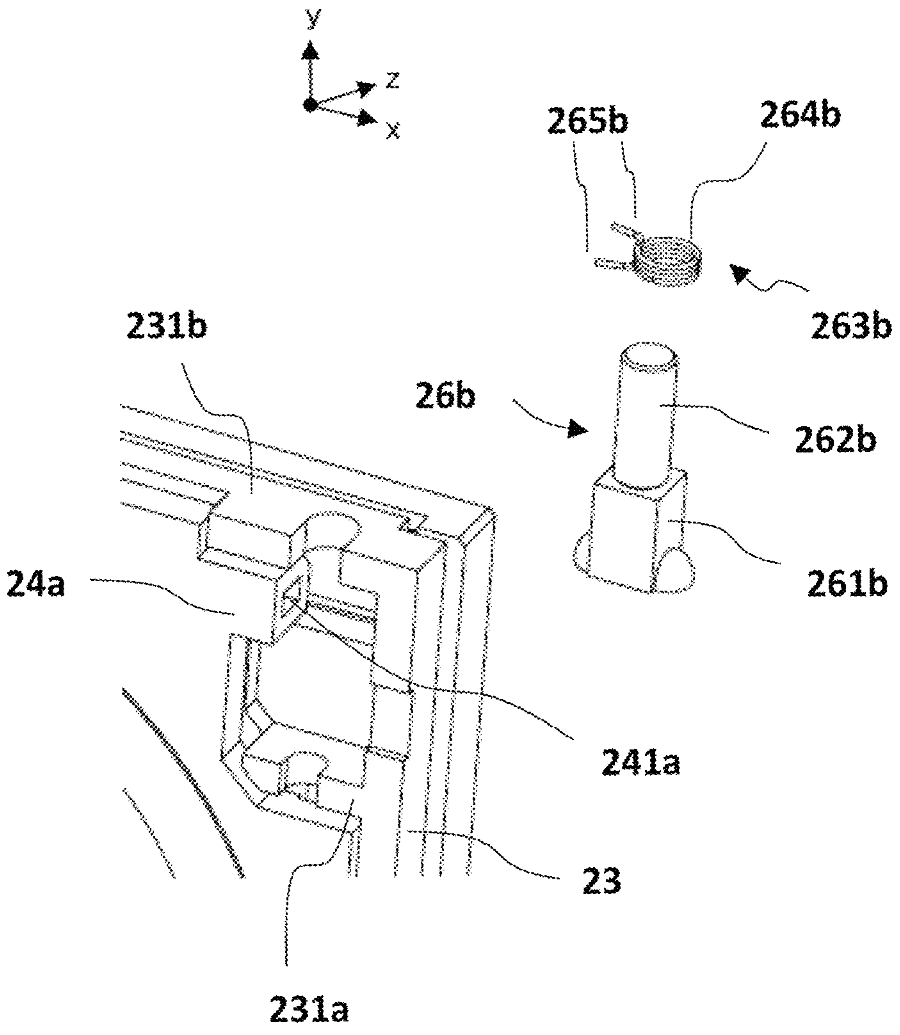
FIG. 14 is an exploded perspective view showing the schematic configuration of the periphery of the driving unit 26*b* in the second embodiment.

As shown in FIG. 13 and FIG. 14, the driving unit 26*b* has an electromechanical converting element 261*b*, a drive shaft 262*b* and a coil spring 263*b* as a transmission member. The coil spring 263*b* has a coil portion 264*b* and two arm portions 265*b*. The drive shaft 262*b* is press-fitted into the coil spring 263*b*. The inner diameter of the coil spring 263*b* is smaller than the outer diameter of the drive shaft 262*b*, and when the drive shaft 262*b* is press-fitted into the coil spring 263*b*, the coil spring 263*b*, which is an elastic body, expands in diameter and the coil spring 263*b* and the drive shaft 262*b* engage in friction.

Figure 15:
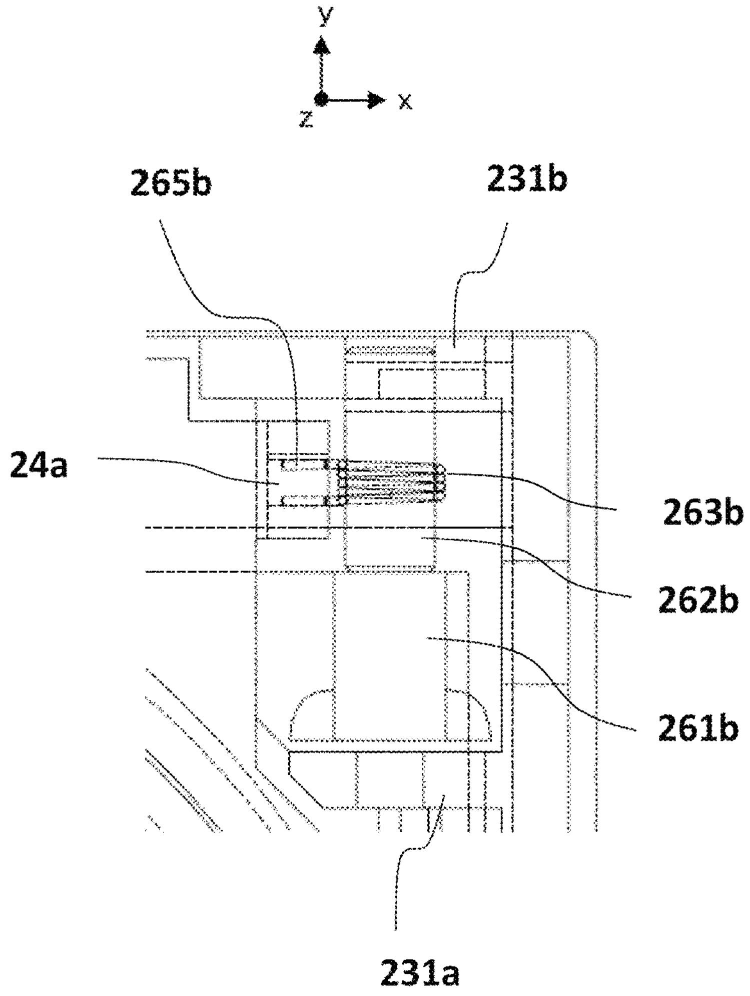
FIG. 15 is a front view showing the schematic configuration of the periphery of the driving unit 26*b* in the second embodiment.

As shown in FIG. 13 to FIG. 15, the electromechanical converting element 261*b* of the driving unit 26*b* is fixed on one end 231*a* on the −y direction side of the supporting member 23*b* of the x-direction moving frame 23. The drive shaft 262*b* of the driving unit 26*b* is inserted into a U groove portion formed on one end 231*b* on the +y direction side of the x-direction moving frame 23. Two arm portions 265*b* of the coil spring 263*b* of the driving unit 26*b* transmit the driving force transmitted to the coil spring 263*b* to the y-direction moving frame 24 by being inserted into an engagement hole 241*a* provided in the contacting portion 24*a* of the y-direction moving frame 24. The electromechanical converting element 261*b* expands and contracts in the ±y direction, which in turn allows the drive shaft 262*b* to move back and forth, the coil spring 263*b* to move in the ±y direction, and can drive the y-direction moving frame 24 to move in the ±y direction.

Similarly, the electromechanical converting element of the driving unit 26*a* expands and contracts in the ±x direction, which in turn allows the drive shaft to move back and forth, the coil spring to move in the ±x direction, and can drive the x-direction moving frame 23 to move in the ±x direction. The electromechanical converting element of the driving unit 26*c* expands and contracts in the tangential direction of the rotary frame 25, which in turn allows the drive shaft to move back and forth, the coil spring to move in the tangential direction of the rotary frame 25, and the rotary frame 25 to rotate.

Figure 16:
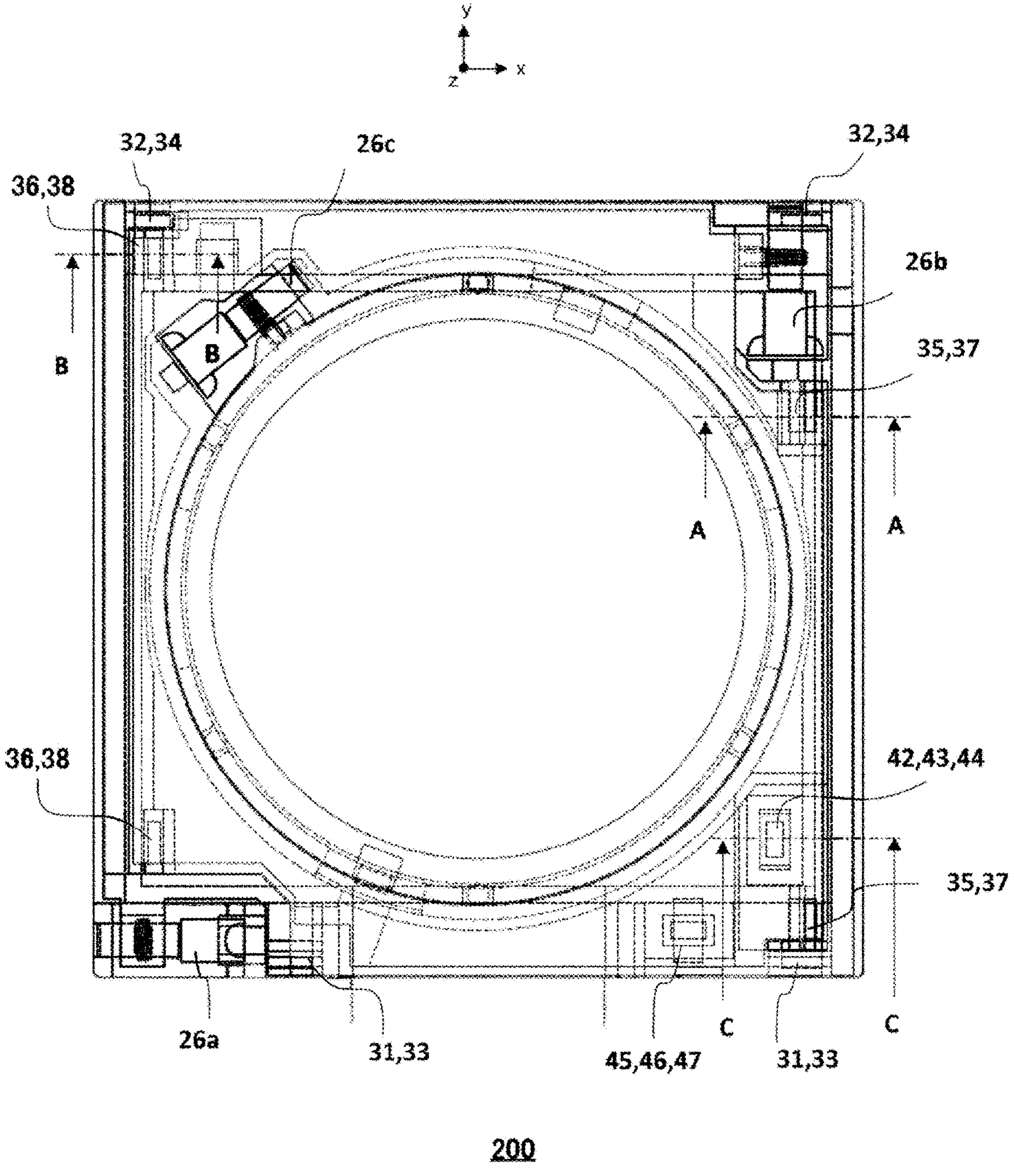
FIG. 16 is a front view showing the schematic configuration of the optical driving apparatus 200 in the second embodiment.
Figure 17:
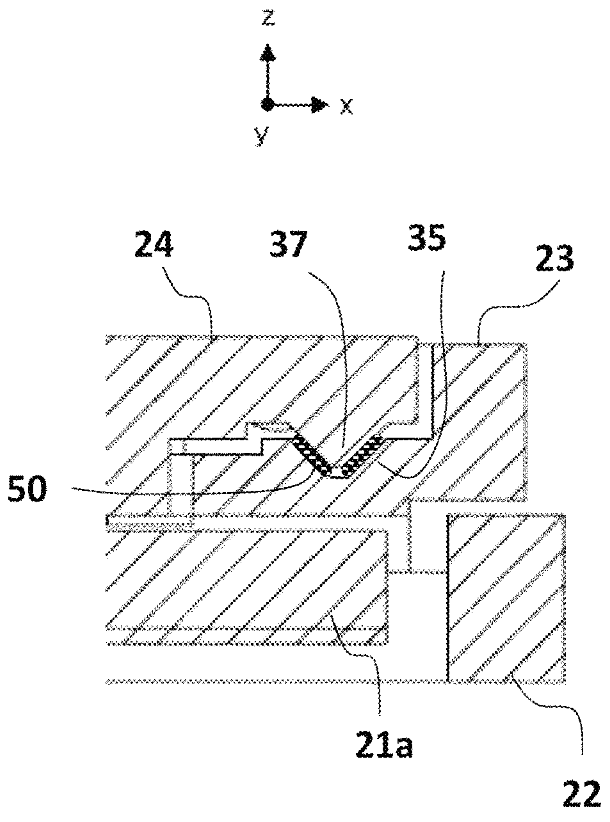
FIG. 17 is a sectional view taken along line A-A of FIG. 16.

FIG. 16 is a front view showing the schematic configuration of the optical driving apparatus 200 in the second embodiment. FIG. 17 is a sectional view taken along line A-A of FIG. 16, FIG. 18 is a sectional view taken along line B-B of FIG. 16, and FIG. 19 is a sectional view taken along line C-C of FIG. 16.

As shown in FIG. 17, the groove portion 35 of the x-direction moving frame 23 and the convex portion 37 of the y-direction moving frame 24 contact each other via the gel 50 containing the plurality of microspheres, and extend in the y direction. Accordingly, the movement of the y-direction moving frame 24 with respect to the x-direction moving frame 23 is restricted to be in the ±y direction.

Figure 18:
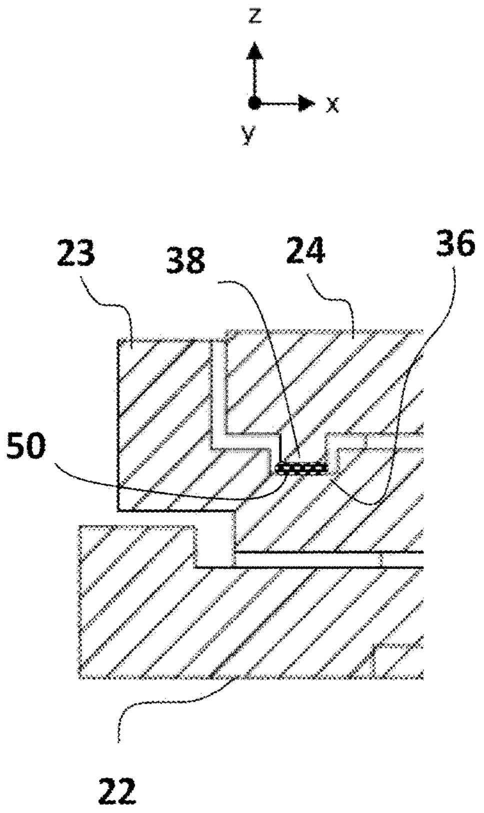
FIG. 18 is a sectional view taken along line B-B of FIG. 16.
Figure 19:
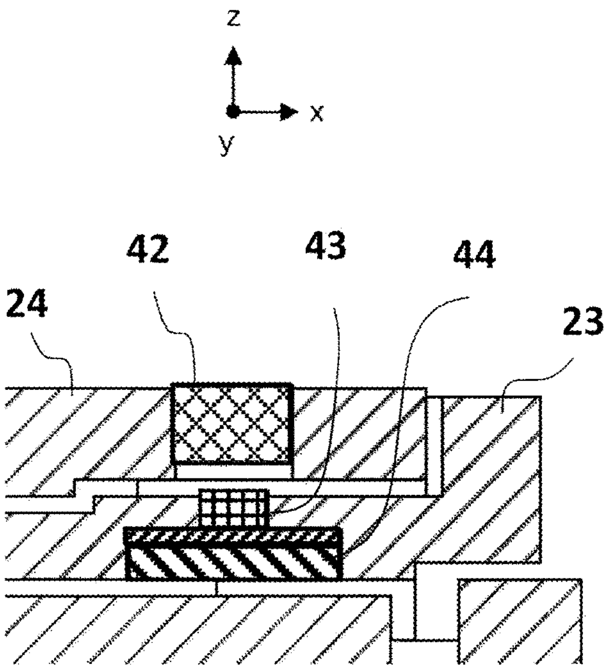
FIG. 19 is a sectional view taken along line C-C of FIG. 16.

As shown in FIG. 18, the groove portion 36 of the x-direction moving frame 23 and the convex portion 38 of the y-direction moving frame 24 contacts each other via the gel 50 containing the plurality of microspheres, and extend in the y direction. The groove portion 36 and the convex portion 38 are arranged with an interspace in the x direction as shown in the figure, which restricts the movement of the x-direction moving frame 23 and the y-direction moving frame 24 by the groove portion 35 and the convex portion 37 in the ±y direction, while preventing them from becoming overconstrained in the ±x direction. Such an interspace in the x direction is the same as the interspace p2 (see FIG. 7) in the first embodiment.

Similar to the movement of the y-direction moving frame 24 with respect to the x-direction moving frame 23 being restricted in the ±y direction, the groove portions 31 and 32 of the base frame and the convex portions 33 and 34 of the x-direction moving frame restrict the movement of the x-direction moving frame 23 with respect to the base frame 22 in the ±x direction. The ball 39 arranged between the y-direction moving frame 24 and the rotary frame 25 restricts the movement of the rotary frame 25 with respect to the y-direction moving frame 24 in the rotational direction parallel to the xy plane.

As shown in FIG. 19, the plate 44 made of metallic magnetic and the detecting magnet 42 attract each other with the magnetic force. In this manner, the x-direction moving frame 23 with the plate 44 fixed thereon the and the y-direction moving frame 24 with the detecting magnet 42 fixed thereon attract each other with the magnetic force and become integral.

Similarly, the base frame 22 with the plate 45 made of metallic magnetic fixed thereon and the x-direction moving frame 23 with the detecting magnet 47 fixed thereon attract each other with the magnetic force and become integral. The hall element 43 fixed on the x-direction moving frame 23 detects the magnetic field of the detecting magnet 42 fixed on the y-direction moving frame 24, and detects the relative position of the y-direction moving frame 24 in the xy plane direction with respect to the x-direction moving frame 23. Similarly, the hall element 46 detects the relative position of the x-direction moving frame 23 with respect to the base frame 22. The magnetic force acting on the magnet 40 fixed on the x-direction moving frame 23, the plate 48 fixed on the y-direction moving frame 24 and the plate 41 fixed on the base frame 22 assists in the attraction between the x-direction moving frame 23, the y-direction moving frame 24 and the base frame 22.

Effects of Second Embodiment

Effect 2-1

According to the optical driving apparatus 200 in the second embodiment, the rotary frame 25 is movable in the ±x direction and the ±y direction, and rotatable in the direction parallel to the xy plane with respect to the base frame 22. Accordingly, the optical driving apparatus 200 can be used as an image stabilization apparatus by translating and rotating the image sensor 21*a* along a plane perpendicular to the optical axis of the lens.

Effect 2-2

According to the optical driving apparatus 200 in the second embodiment, the same effects as (effect 1-1) to (effect 1-7) of the optical driving apparatus 100 in the first embodiment described above can be achieved.

Configuration of Third Embodiment

Figure 20:
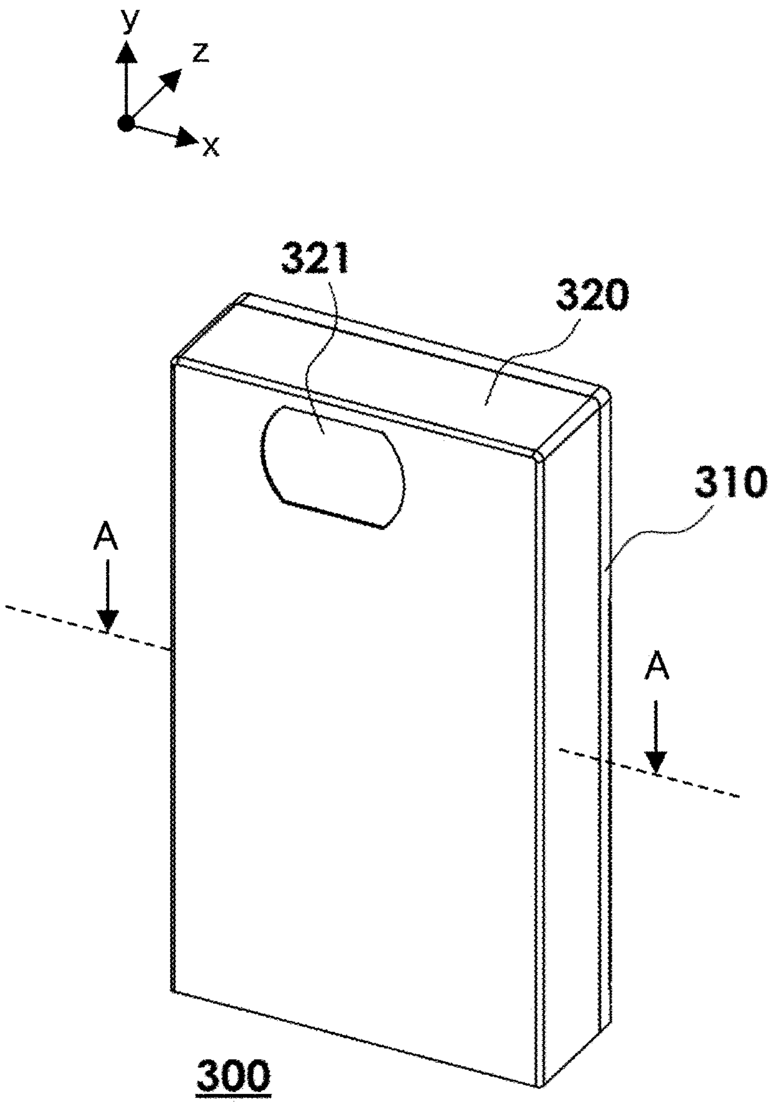
FIG. 20 is a perspective view showing a schematic configuration of a zoom camera unit 300 in a third embodiment.
Figure 21:
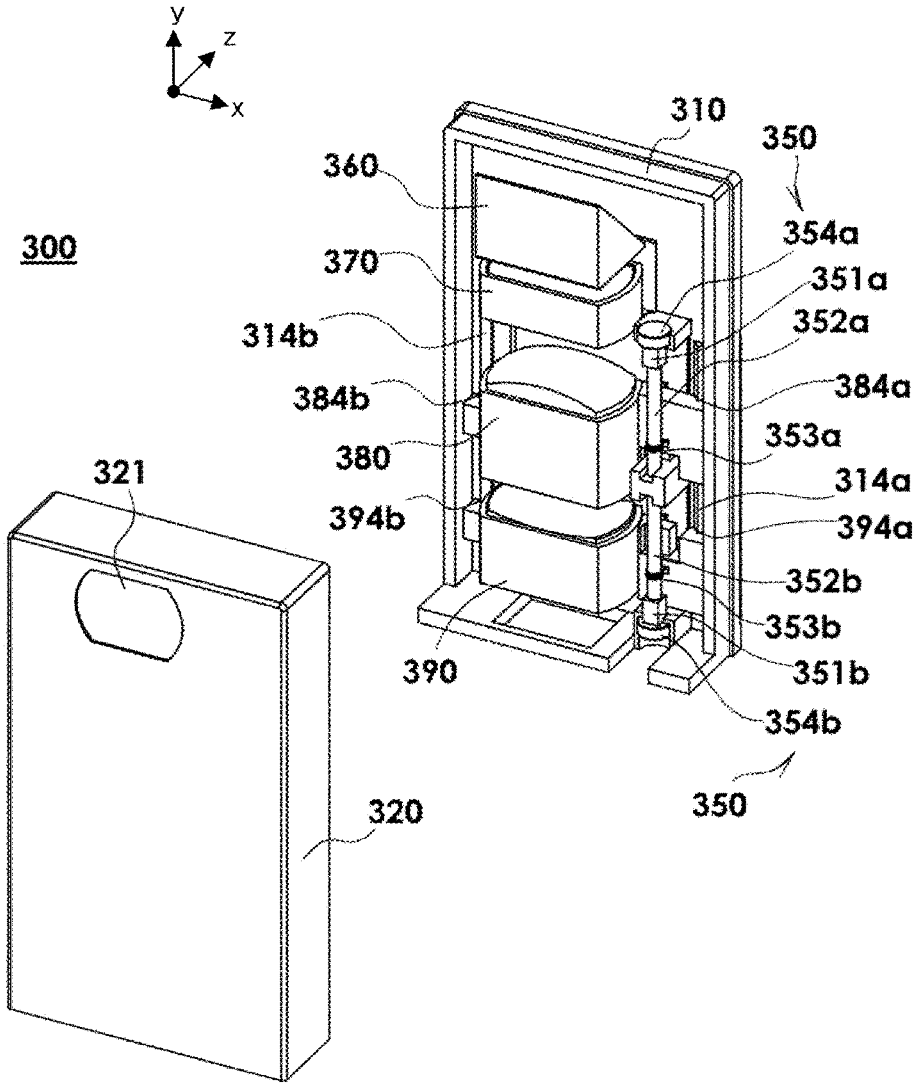
FIG. 21 is a perspective view showing that a cover 320 of the zoom camera unit 300 is removed in the third embodiment.
Figure 22:
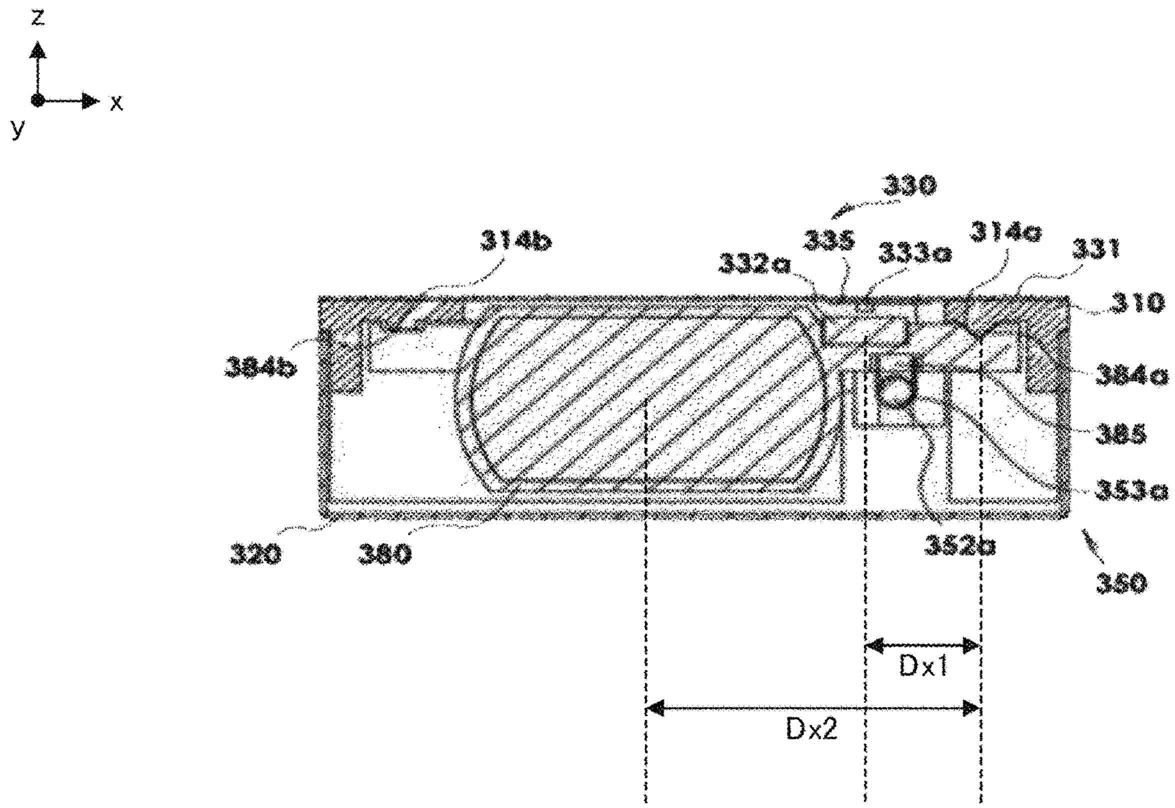
FIG. 22 is a sectional view taken along line A-A of FIG. 20.
Figure 23:
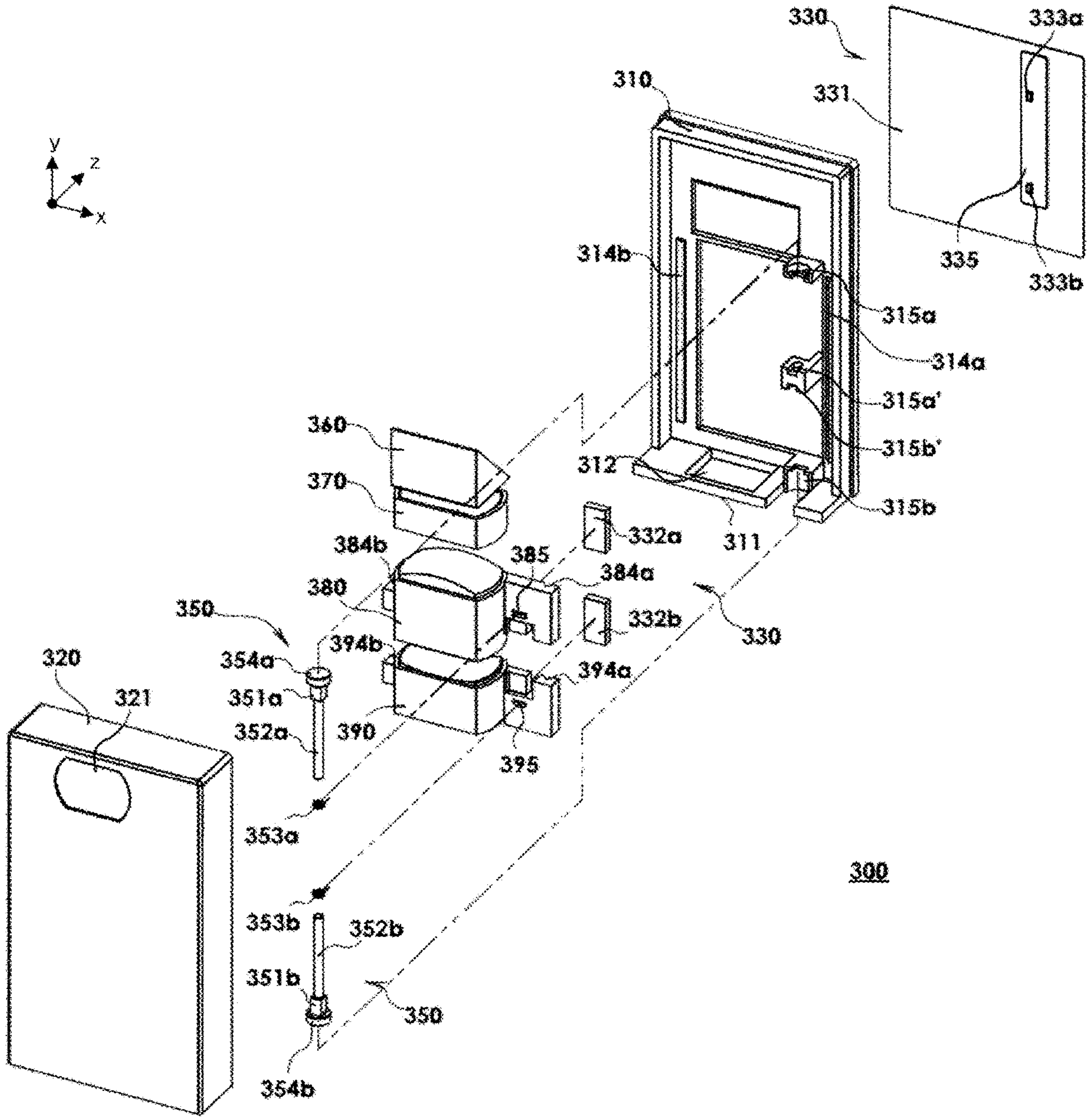
FIG. 23 is an exploded perspective view showing the schematic configuration of the zoom camera unit 300 in the third embodiment.

FIG. 20 is a perspective view showing a schematic configuration of a zoom camera unit 300 in a third embodiment, and FIG. 21 is a perspective view showing that a cover 320 of the zoom camera unit 300 is removed in the third embodiment, and FIG. 22 is a sectional view taken along line A-A of FIG. 20. FIG. 23 is an exploded perspective view showing the schematic configuration of the zoom camera unit 300 in the third embodiment.

Figure 24:
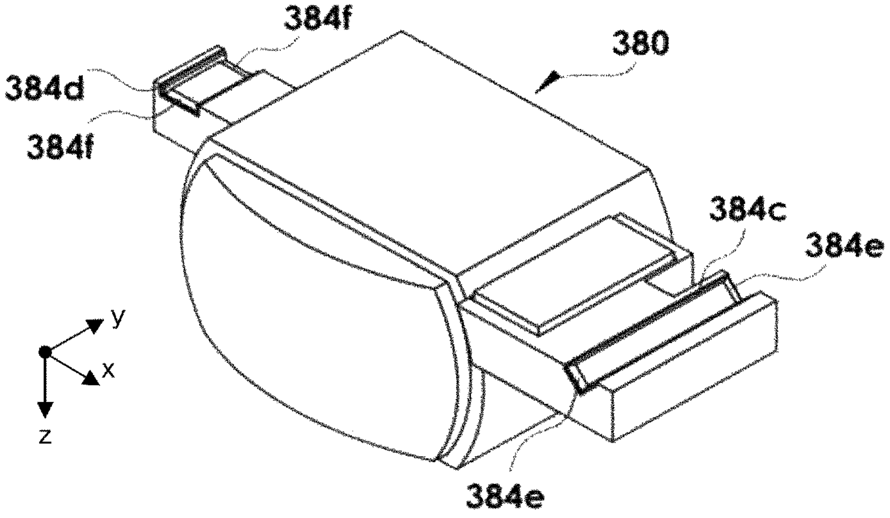
FIG. 24 is a perspective view showing the schematic configuration of the third lens group 380 in third embodiment.
Figure 25:
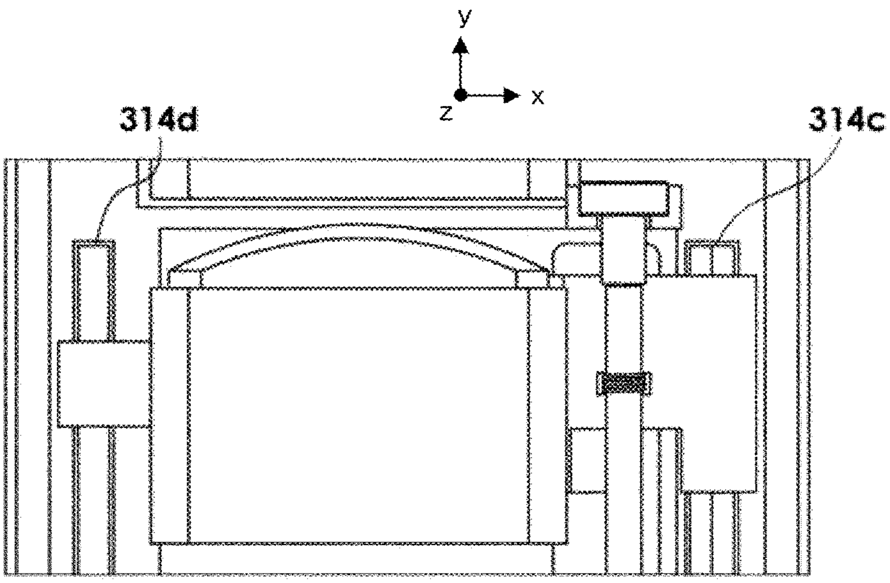
FIG. 25 is a partially enlarged front view showing a schematic configuration of a periphery of a third lens group 380 in the third embodiment.
Figure 26:
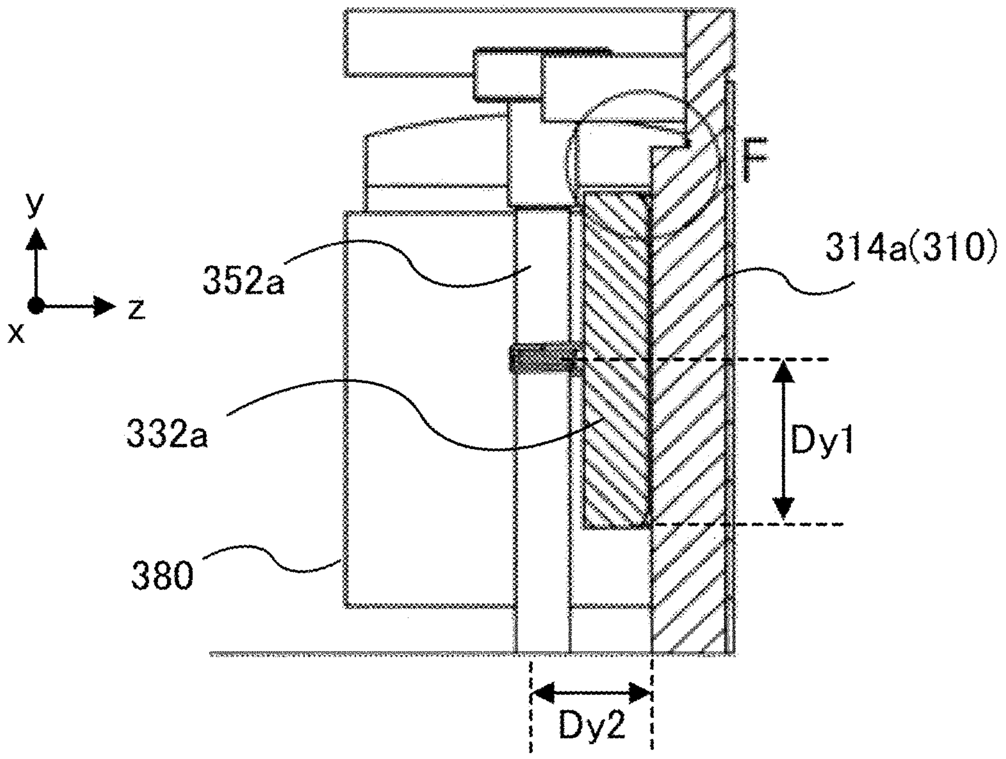
FIG. 26 is a side sectional view showing the schematic configuration of the periphery of the third lens group 380 in the third embodiment.
Figure 27:
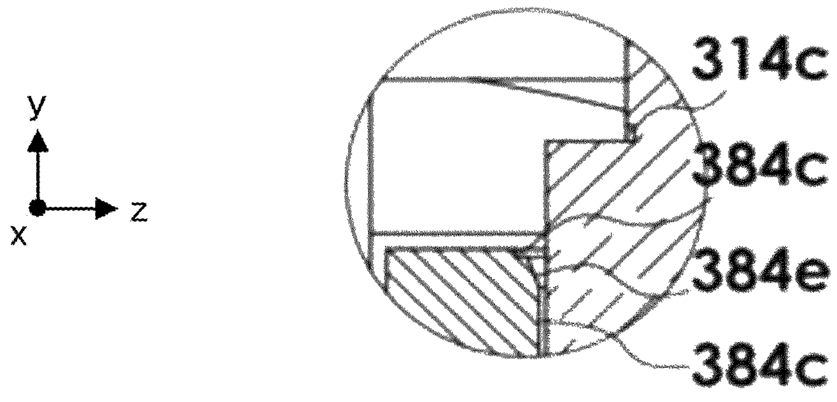
FIG. 27 is an enlarged view of a range F of FIG. 26.

FIG. 24 is a perspective view showing a schematic configuration of a third lens group 380 in the third embodiment, FIG. 25 is a partially enlarged front view showing a schematic configuration of a periphery of the third lens group 380 in the third embodiment, FIG. 26 is a side sectional view showing the schematic configuration of the periphery of the third lens group 380 in the third embodiment, and FIG. 27 is an enlarged view of a range F of FIG. 26. The zoom camera unit 300 shown in FIG. 20 to FIG. 27 is used while being incorporated in an apparatus that performs magnification change and focusing by moving a plurality of lens groups respectively, for example, an image capturing apparatus. In the following description of the zoom camera unit 300 in the third embodiment, duplicated descriptions are omitted for configurations identical or similar to the optical driving apparatus 100 in the first embodiment.

As shown in FIG. 20, the zoom camera unit 300 in the third embodiment has a fixed frame 310 as a fixed member and a cover 320. A subject side aperture 321 is provided in the cover 320. As shown in FIG. 21 to FIG. 23, the zoom camera unit 300 further has a lens position detecting portion 330, an actuator portion 350, a first lens group 360, a second lens group 370, a third lens group 380 as a driven member, and a fourth lens group 390 as a driven member.

The zoom camera unit 300 in the third embodiment, bends a light ray entering from the subject side aperture 321 of the cover 320 by 90° with the first lens group 360, which is a prism, and directs the light ray through the second lens group 370, the third lens group 380 and the fourth lens group 390 to the image capturing element, which is not illustrated, fixed on the imaging side aperture 312 of the image capturing element fixing portion 311 of the fixed frame 310 to form an image.

The first lens group 360 and the second lens group 370 are fixed lens groups, and the third lens group 380 and the fourth lens group 390 are movable lens groups. The third lens group 380 and the fourth lens group 390 move independently respectively in the optical axis direction (±y direction) by the actuator portion 350 to change the relative distance between the second lens group 370, the third lens group 380, the fourth lens group 390 and the image capturing element. In this manner, magnification change and focusing are performed.

As shown in FIG. 23 and FIG. 25, an image capturing element fixing portion 311, an imaging side aperture 312, a V-shaped convex portion 314*a*, a flat-shaped convex portion 314*b*, a V-shaped convex portion circumferential groove 314*c*, a flat-shaped convex portion circumferential groove 314*d*, an actuator holding portion (fixed side) 315*a*, an actuator holding portion (movable side) 315*a*', a actuator holding portion (fixed side) 315*b* and an actuator holding portion (movable side 315*b*') are formed on the fixed frame 310.

As shown in FIG. 23, the V-shaped convex portion 314*a* is a first convex portion in a V-shaped cross-sectional shape, formed integrally with the fixed frame 310. The V-shaped convex portion 314*a* fits a V-shaped groove 384*a* that is a first groove of the V-shaped cross-sectional shape formed on the third lens group 380. As shown in FIG. 25 and FIG. 27, the V-shaped convex portion circumferential groove 314*c* is formed in the circumference of the V-shaped convex portion 314*a*. The V-shaped convex portion circumferential groove 314*c* is a gel housing portion formed to prevent the diffusion of the gel containing microspheres.

As shown in FIG. 23, the flat-shaped convex portion 314*b* is a second convex portion in a flat cross-sectional shape, formed integrally with the fixed frame 310. The flat-shaped convex portion 314*b* fits the flat-shaped groove 384*b* that is a second groove in the flat cross-sectional shape formed in the third lens group 380. As shown in FIG. 25, the flat-shaped convex portion circumferential groove 314*d* is formed in the circumference of the flat-shaped convex portion 314*b*. The flat-shaped convex portion circumferential groove 314*d* is a gel housing portion formed to prevent the diffusion of the gel containing microspheres.

As shown in FIG. 23 and FIG. 24, the V-shaped groove 384*a*, the flat-shaped groove 384*b*, the V-shaped groove circumferential groove 384*c*, the flat-shaped groove circumferential groove 384*d*, the V-shaped groove edge slope 384*e*, the flat-shaped groove edge slope 384*f*, the coil spring engagement portion 385 are formed in the third lens group 380. The V-shaped groove 394*a*, the flat-shaped groove 394*b*, the coil spring engagement portion 395 are formed in the fourth lens group 390.

The V-shaped groove 384*a* is a first groove in the V-shaped cross-sectional shape that fits the V-shaped convex portion 314*a*. The flat-shaped groove 384*b* is a second groove in the flat cross-sectional shape that fits the flat-shaped convex portion 314*b*. The V-shaped groove circumferential groove 384*c* and the flat-shaped groove circumferential groove 384*d* are grooves formed to prevent the diffusion of the gel containing microspheres. The V-shaped groove edge slope 384*e* and the flat-shaped groove edge slope 384*f* are inclined portions to guide the gel containing microspheres to the fitting surface stably. The coil spring engagement portion 385 engages the coil spring 353*a* of the actuator portion 350.

The V-shaped groove 394*a* in the fourth lens group 390 is a first groove in the V-shaped cross-sectional shape that fits the V-shaped convex portion 314*a*. The flat-shaped groove 394*b* is a second groove in the flat cross-sectional shape that fits the flat-shaped convex portion 314*b*. The coil spring engagement portion 395 engages the coil spring 353*b* of the actuator portion 350.

The V-shaped convex portion 314*a*, the flat-shaped convex portion 314*b*, the V-shaped groove 384*a* and the flat-shaped groove 384*b* compose the guiding member of the zoom camera unit 300 in the third embodiment. Similar to the other embodiments, by inserting the gel containing microspheres into the fitting surface between the V-shaped convex portion 314*a* and the V-shaped groove 384*a*, and the fitting surface between the flat-shaped convex portion 314*b* and the flat-shaped groove 384*b*, the third lens group 380 and the fourth lens group 390 are respectively independently movable with respect to the fixed frame 310 without a large resistance in the ±y direction in FIG. 23.

As shown in FIG. 23, the actuator portion 350 is an actuator of the third lens group 380, having an electromechanical converting element 351*a*, a drive shaft 352*a*, a coil spring 353*a* and a weight 354*a*. The actuator portion 350 is an actuator of the fourth lens group 390, having an electromechanical converting element 351*b*, a drive shaft 352*b*, a coil spring 353*b* and a weight 354*b*. Each component in the actuator portion 350 is similar to each of the components of the driving unit 5 in the first embodiment and has similar functions.

As shown in FIG. 23, the weight 354*a* is made of a material with a sufficiently larger mass inertia than the drive shaft 352*a* to transmit the vibration of the electromechanical converting element 351*a* to the drive shaft 352*a* side. The weight 354*a* is fixed on an end surface that is the opposite side of the drive shaft 352*a* side of the electromechanical converting element 351*a*. Similarly, the weight 354*b* is made of a material with a sufficiently larger mass inertia than the drive shaft 352*b* to transmit the vibration of the electromechanical converting element 351*b* to the drive shaft 352*b* side. The weight 354*b* is fixed on an end surface that is the opposite side of the drive shaft 352*b* side of the electromechanical converting element 351*b*.

As shown in FIG. 23, the actuator for the third lens group 380 is fixed between the actuator holding portion 315*a* on the fixed side and the actuator holding portion 315*a*' on the movable side. On the actuator holding portion 315*a* side on the fixed side, the weight 354*a* is fixed, and on the actuator holding portion 315*a*' side on the movable side, the front end portion of the drive shaft 352*a* is held movably in the axial direction. The coil spring 353*a* moves in the up-down direction (±y direction in FIG. 23) as the electromechanical converting element 351*a* expands and contracts, and the third lens group 380 moves in the up-down direction (±y direction in FIG. 23) as the coil spring 353*a* engages the third lens group 380 with the coil spring engagement portion 385. The relative distance between the second lens group 370, the third lens group 380 and the fourth lens group 390 is adjusted by the movement of the third lens group 380.

As shown in FIG. 23, an actuator for the fourth lens group 390 is fixed between the actuator holding portion 315*b* on the fixed side and the actuator holding portion 315*b*' on the movable side. On the actuator holding portion 315*b* side on the fixed side, the weight 354*b* is fixed, and on the actuator holding portion 315*b*' side on the movable side, the front end portion of the drive shaft 352*b* is held movably in the axial direction. The coil spring 353*b* moves in the up-down direction (±y direction in FIG. 23) as the electromechanical converting element 351*b* expands and contracts, and the fourth lens group 390 moves in the up-down direction (±y direction in FIG. 23) as the coil spring 353*b* engages the fourth lens group 390 with the coil spring engagement portion 395. The relative distance between the third lens group 380, the fourth lens group 390 and the image capturing element is adjusted by the movement of the fourth lens group 390.

As shown in FIG. 23, the lens position detecting portion 330 has a plate 331 fixed on the fixed frame 310. The plate 331 is made of magnetic material. An FPC 335 is affixed to the plate 331, a hall element 333*a* for position detection of the third lens group 380 and a hall element 333*b* for position detection of the fourth lens group 390 are mounted on the FPC 335.

The hall element 333*a* detects the magnetic field of the magnet 332*a* fixed on the third lens group 380, and detects the relative position with respect to the fixed frame 310 in the y direction of the third lens group 380. The hall element 333*b* detects the magnetic field of the magnet 332*b* fixed on the fourth lens group 390, and detects the relative position with respect to the fixed frame 310 in the y direction of the fourth lens group 390.

The plate 331 equipped with the hall element 333*a* and the hall element 333*b* is a magnetic body, and attracts the third lens group 380 and the fourth lens group 390 with respect to the fixed frame 310 in the +z direction by the plate 331 and a set of the magnet 332*a* and the magnet 332*b* attracting each other with the magnetic force. Accordingly, the free separation between the fixed frame 310 as the fixed member and a set of the third lens group 380 and the fourth lens group 390 as driven members is prevented.

In FIG. 22, when gravity acts in the −z direction, the distance between the fulcrum position considering the balance between the gravity of the third lens group 380 and the moment of attraction force of the magnet 332*a*, and the center position in the x direction of the magnet 332*a*, which is a magnetic body, is shown as Dx1(mm). The distance between the above-described fulcrum position and the position of the center of gravity that is a reference point in the x direction of the third lens group 380, which is the driven member, is shown as Dx2(mm). Herein, when the attraction force of the magnet 332*a* is M(kgf) and the weight of the third lens group 380 is m(kgf), $M>1.5\ m\times Dx2/Dx1$ is desirable.

By having Dx1(mm), Dx2(mm), M(kgf) and m(kgf) satisfying the above-described relational expression, the third lens group 380 is attracted to the fixed frame 310 by a sufficient attraction force due to the attraction force of the magnet 332*a*, and the third lens group 380 is movable with respect to the fixed frame 310 in the ±y direction along the V-shaped convex portion 314*a*, which is the guiding member.

In FIG. 26, when gravity acts in the y direction, the distance between the fulcrum position when calculating the balance between the gravity of the third lens group 380 and the moment of attraction force of the magnet 332*a* and the center position in the y direction of the magnet 332*a*, which is a magnetic body, is shown as Dy1(mm). The distance between the above-described fulcrum position and the position of the center of gravity that is a reference point in the z direction of the third lens group 380, which is the driven member, is shown as Dy2(mm). Herein, when the attraction force of the magnet 332*a* is M(kgf) and the weight of the third lens group 380 is m(kgf), $M>1.5\ m\times Dy2/Dy1$ is desirable.

By having Dy1(mm), Dy2(mm), M(kgf) and m(kgf) satisfying the above-described relational expression, the third lens group 380 is attracted to the fixed frame 310 by a sufficient attraction force due to the attraction force of the magnet 332*a*, and the third lens group 380 is movable with respect to the fixed frame 310 in the ±y direction along the V-shaped convex portion 314*a*, which is the guiding member.

Effects of Third Embodiment

Effect 3-1

According to the zoom camera unit 300 in the third embodiment, the third lens group 380 and the fourth lens group 390, which are the driven members, are movable with respect to the fixed frame 310, which is the fixed member. Accordingly, the zoom camera unit 300 can be used as a zoom camera unit that performs magnification change and focusing.

Effect 3-2

According to the zoom camera unit 300 in the third embodiment, the same effects as (effect 1-1) to (effect 1-7)

of the optical driving apparatus 100 in the first embodiment described above can be achieved.

Configuration of Fourth Embodiment

Figure 28:
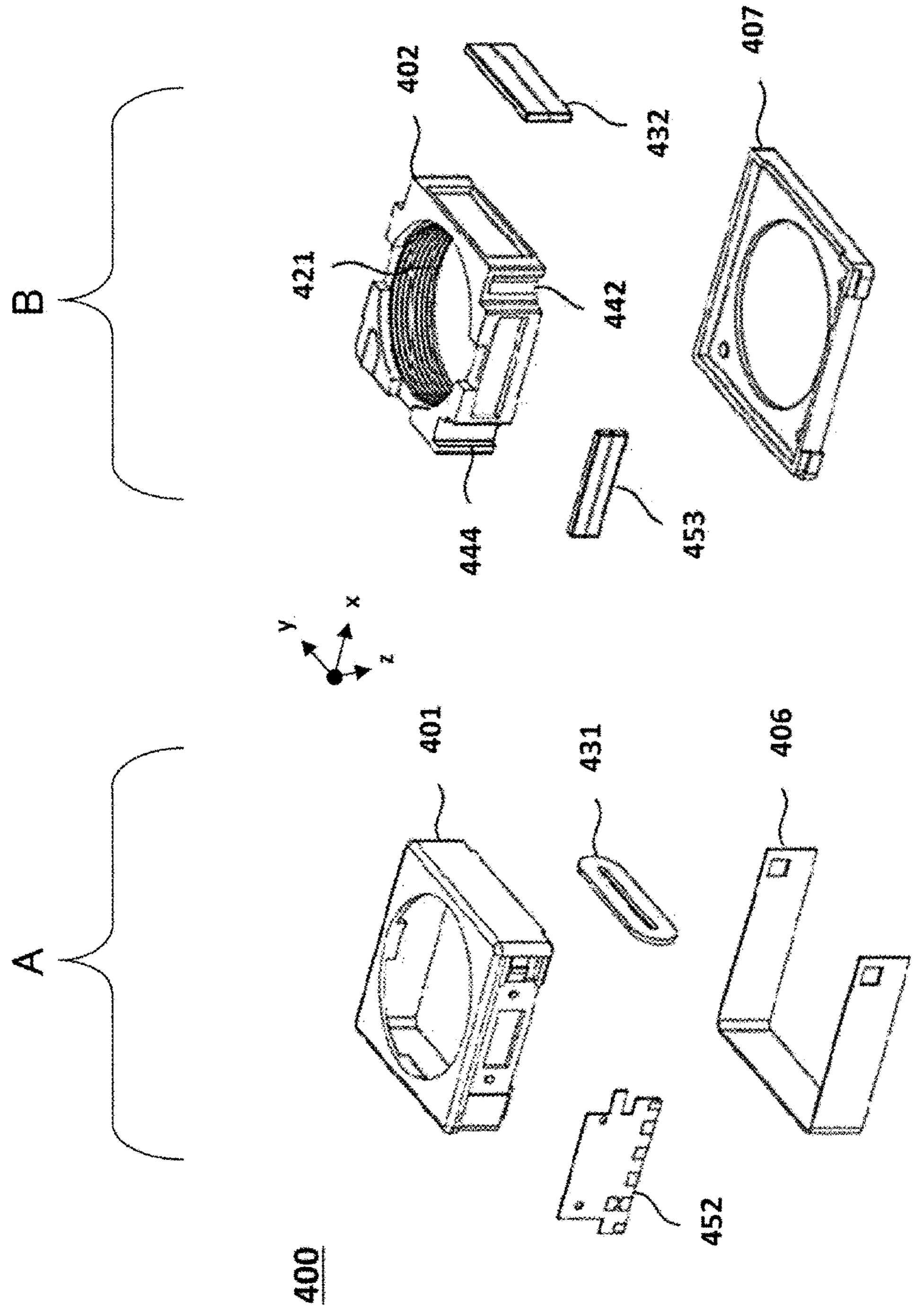
FIG. 28 is an exploded perspective view showing a configuration of a lens driving apparatus 400 in a Fourth embodiment.
Figure 29:
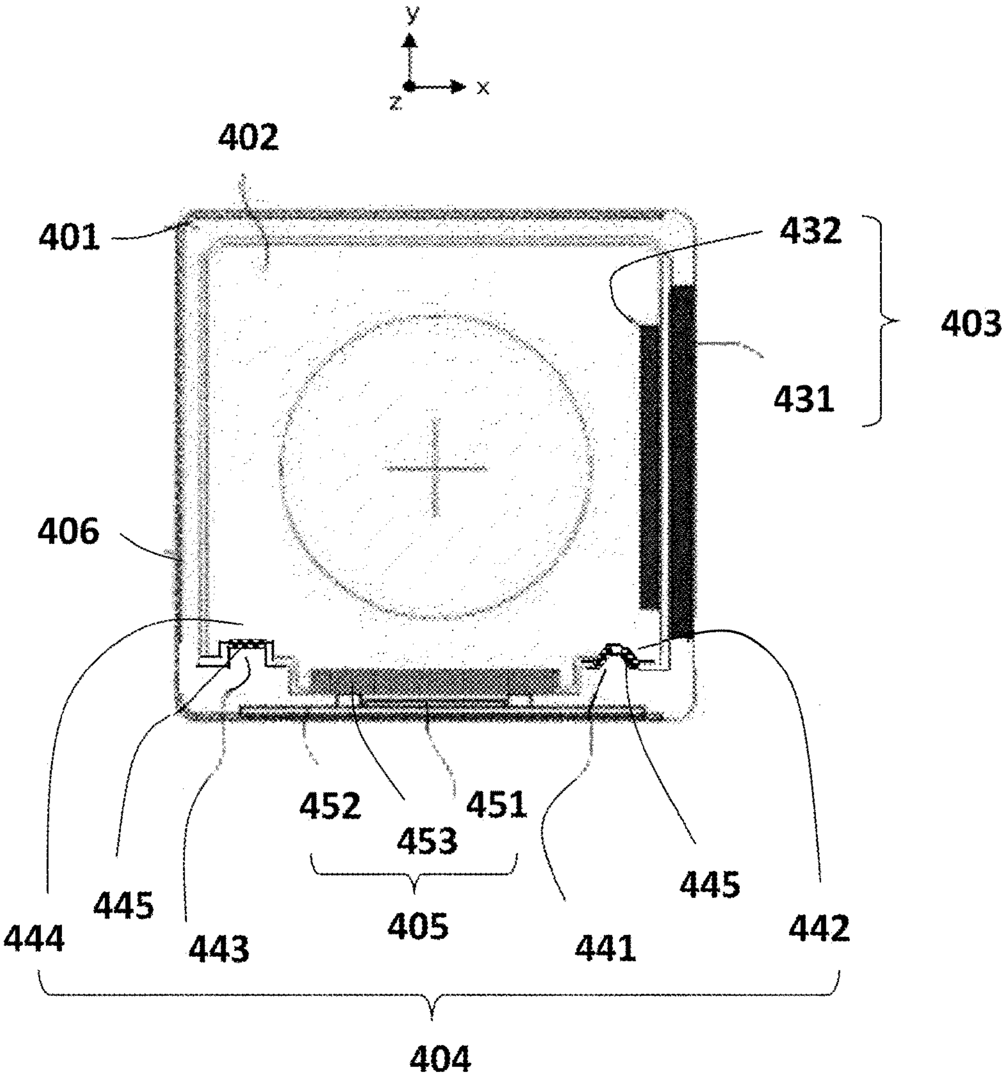
FIG. 29 is a cross-sectional view showing the configuration of the lens driving apparatus 400 in the Fourth embodiment.

FIG. 28 is an exploded perspective view showing a configuration of a lens driving apparatus 400 in a fourth embodiment. FIG. 29 is a cross-sectional view showing the configuration of the lens driving apparatus 400 in the fourth embodiment. In FIG. 28, an exploded perspective view is shown, and in FIG. 29, the configuration of the lens driving apparatus 400 is shown without disassembly. The lens driving apparatus 400 shown in FIG. 28 and FIG. 29 is used by being incorporated in an apparatus, for example, an image capturing apparatus, which performs auto-focusing by moving a lens in an optical axis direction. In the following description of the lens driving apparatus 400 in the fourth embodiment, duplicated descriptions are omitted for configurations identical or similar to the optical driving apparatus 100 in the first embodiment.

As shown in FIG. 28 and FIG. 29, the lens driving apparatus 400 is composed of a cover 401 as the fixed member, a bobbin 402 as the driven member, a driving unit 403, a supporting unit 404 as the guiding member, a detecting unit 405, a plate 406 and a base 407. In FIG. 28, 600 shows the cover 401 and the plate 406, and in FIG. 28, 700 shows the bobbin 402 and the base 407.

As shown in FIG. 28, the bobbin 402 includes a lens holding portion 421 that holds the lens (not shown), and moves in the optical axis direction of the lens (±z direction) inside the cover 401. As an example, the bobbin 402 is molded into a polygonal cylindrical shape having a square upper surface by using resin.

As shown in FIG. 29, the driving unit 403 is composed of the coil 431 attached to the cover 401 and the driving magnet 432 attached to the bobbin 402. The driving magnet 432 has different magnetic poles in the optical axis direction of the lens (±z direction). A current in a predetermined direction flowing in the coil 431 can provide an electromagnetic force in the +z direction with respect to the bobbin 402, and a current in the opposite direction can provide an electromagnetic force in the −z direction with respect to the bobbin 402. That is, the bobbin 402 can be driven to be at any position in the ±z direction by controlling a current flowing through the coil 431.

As shown in FIG. 29, the supporting unit 404 as the guiding member is composed of a V-shaped convex portion 441 and a flat-shaped convex portion 443 provided in the cover 401, and a V-shaped groove 442 and a flat-shaped groove 444 provided in the bobbin 402, similarly to the first embodiment. The V-shaped convex portion 441 and the V-shaped groove 442 face each other in a V-shaped cross-sectional plane, while the flat-shaped convex portion 443 and the flat-shaped groove 444 face each other in a flat cross sectional plane. The V-shaped convex portion 441 and the V-shaped groove 442, and the flat-shaped convex portion 443 and the flat-shaped groove 444 are crimped together by the attraction force of the metallic board 452 and the detecting magnet 453 via the gel 445 containing the plurality of microspheres not shown, similarly to the first embodiment.

Accordingly, the bobbin 402 is crimped into and supported by the cover 401 via the gel 445, similar to the first embodiment. The plurality of microspheres in the gel 445 have an identical diameter and roll in contact with the convex portions 441, 443 and grooves 442, 444, so that the bobbin 402 moves without a large resistance force in the optical axis direction (±z direction).

As shown in FIG. 29, the detecting unit 405 is composed of a hall element 451 and a board 452 mounted on the cover 401, and a detecting magnet 453 mounted on the bobbin 402. The hall element 451 detects the magnetic field of the detecting magnet 453, and detects the position of the bobbin 402 (relative position to the cover 401).

When the position of the bobbin 402 detected by the detecting unit 405 and a desired arrangement position of the bobbin 402 do not match, current is caused to flow through the coil 431, and the bobbin 402 can be moved by the driving unit 403.

The driving unit 403 (the coil 431 and the driving magnet 432) is provided to one side of a rectangle shape of the cover 401 and bobbin 402 that have rectangular sections. The supporting unit 404 (the V-shaped convex portion 441, the V-shaped groove 442, the flat-shaped convex portion 443 and the flat-shaped groove 444) and the detecting unit 405 (hall element 451, the board 452 and the detecting magnet 453) are provided on one side perpendicular to another side with the driving unit 403 provided thereon. The other side with the driving unit 403 provided thereon and the one side with the supporting unit 404 and the detecting unit 405 provided thereon may not be perpendicular, or may not be parallel.

Figure 30:
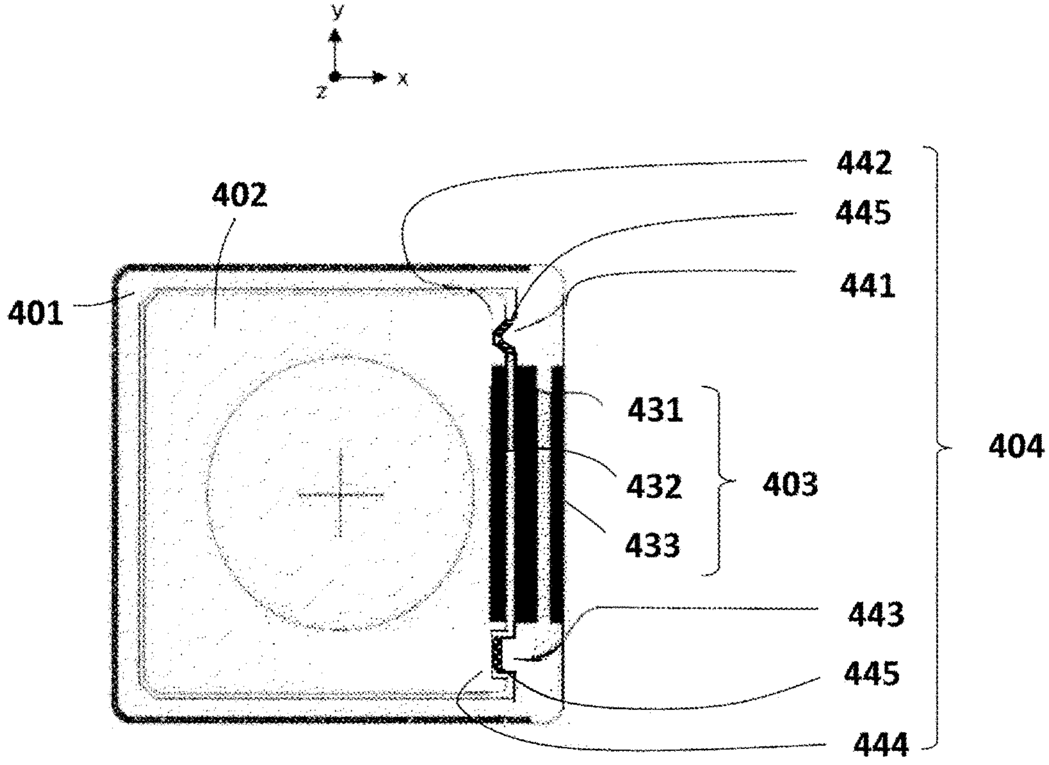
FIG. 30 is a cross-sectional view showing another configuration of the lens driving apparatus 400.

FIG. 30 is a cross-sectional view that shows another configuration of the lens driving apparatus. In FIG. 29, the supporting unit 404 is provided on one side perpendicular to the other side with the driving unit 403 provided thereon. On the other hand, in FIG. 30, the supporting unit 404 is provided on the side identical to the driving unit 403. In FIG. 30, a metal plate 433 is disposed on an outer contour side of the driving unit 403, and the bobbin 402 is crimped into the cover 401 in the x direction by the magnetic force with the driving magnet 432. The configuration of the driving unit 403 and the supporting unit 404 is the same as in the embodiments shown in FIG. 28 and FIG. 29.

Although the lens driving apparatus 400 in the fourth embodiment uses a VCM (Voice Coil Motor) as the driving unit 403, it is not limited to this and other actuators, such as, for example, a rotary or linear ultrasonic motor, can also be used.

Effects of Fourth Embodiment

Effect 4-1

According to the lens driving apparatus 400 in the fourth embodiment, the bobbin 402 as the driven member is movable with respect to the cover 401 as the fixed member. Accordingly, the lens driving apparatus 400 can perform auto-focusing by moving the lens in the optical axis direction.

Effect 4-2

According to the lens driving apparatus 400 in the fourth embodiment, the same effects as (effect 1-1) to (effect 1-7) of the optical driving apparatus 100 in the first embodiment described above can be achieved.

Configuration of Fifth Embodiment

Figure 31:
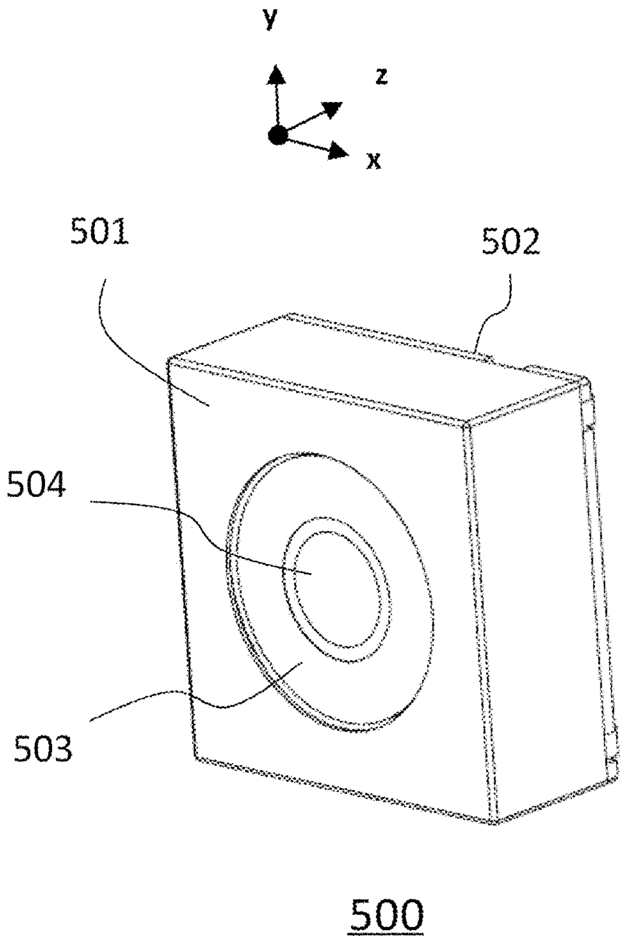
FIG. 31 is a perspective view of an optical driving apparatus 500 in a fifth embodiment.
Figure 32:
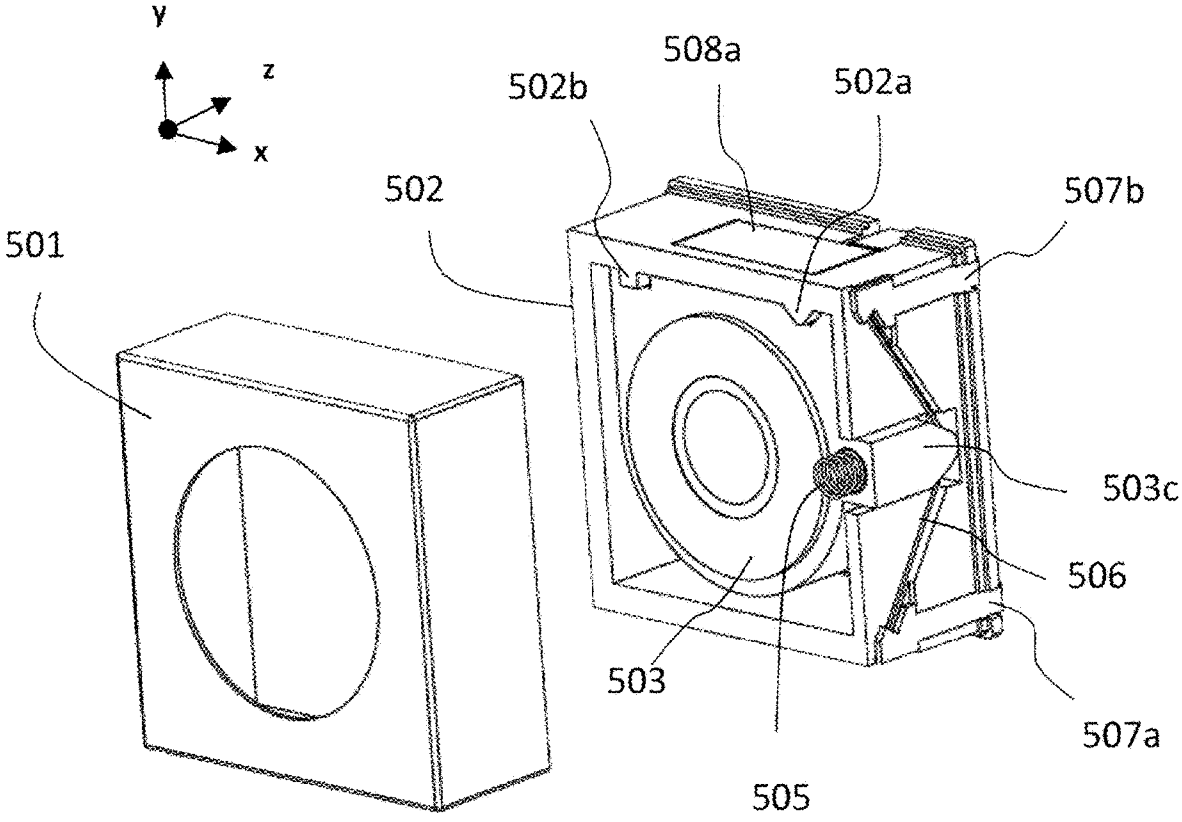
FIG. 32 is a perspective view showing that a cover 501 of the optical driving apparatus 500 is removed in the fifth embodiment.
Figure 33:
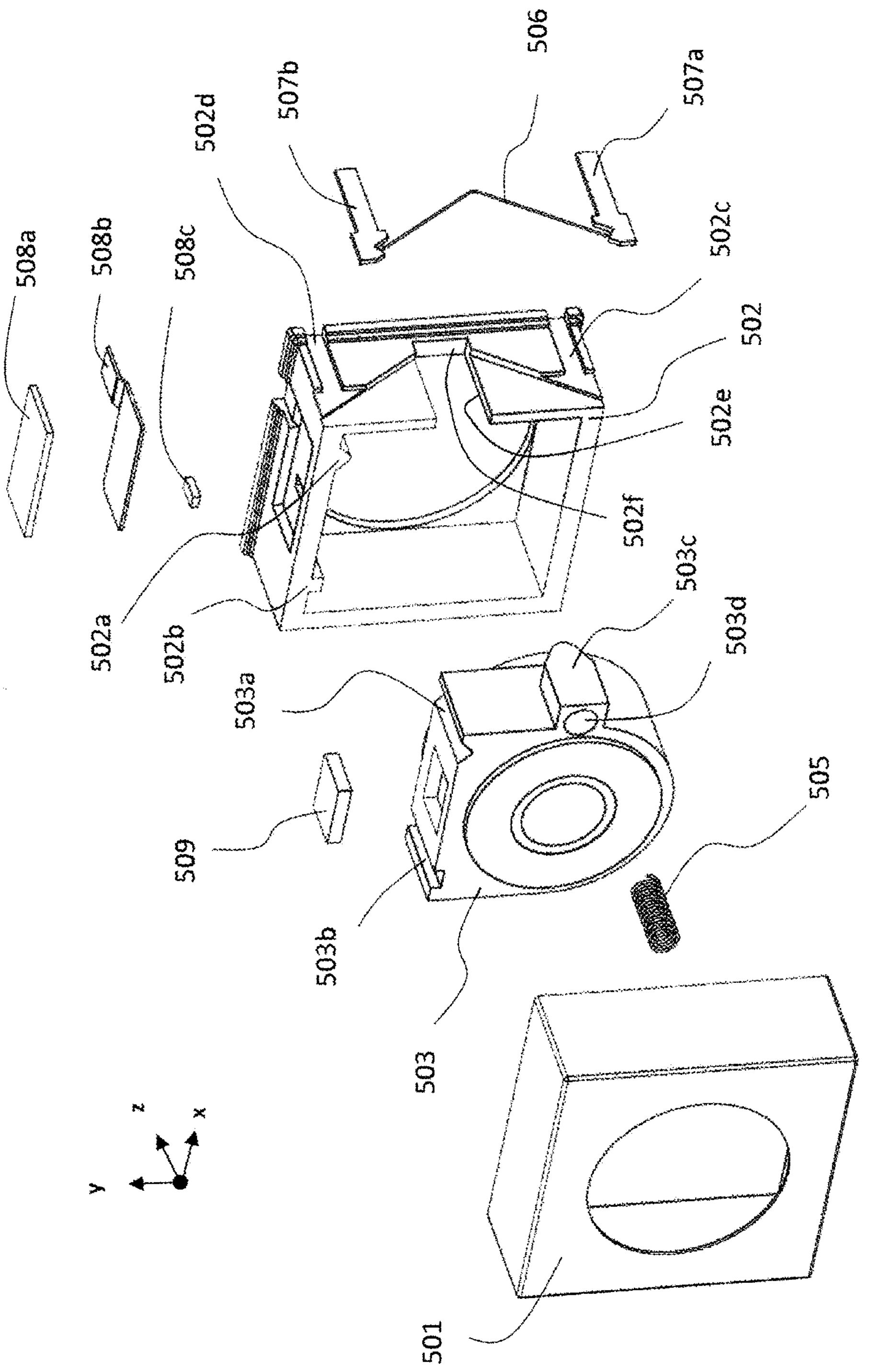
FIG. 33 is an exploded perspective view showing a schematic configuration of the optical driving apparatus 500 in the fifth embodiment.
Figure 34:
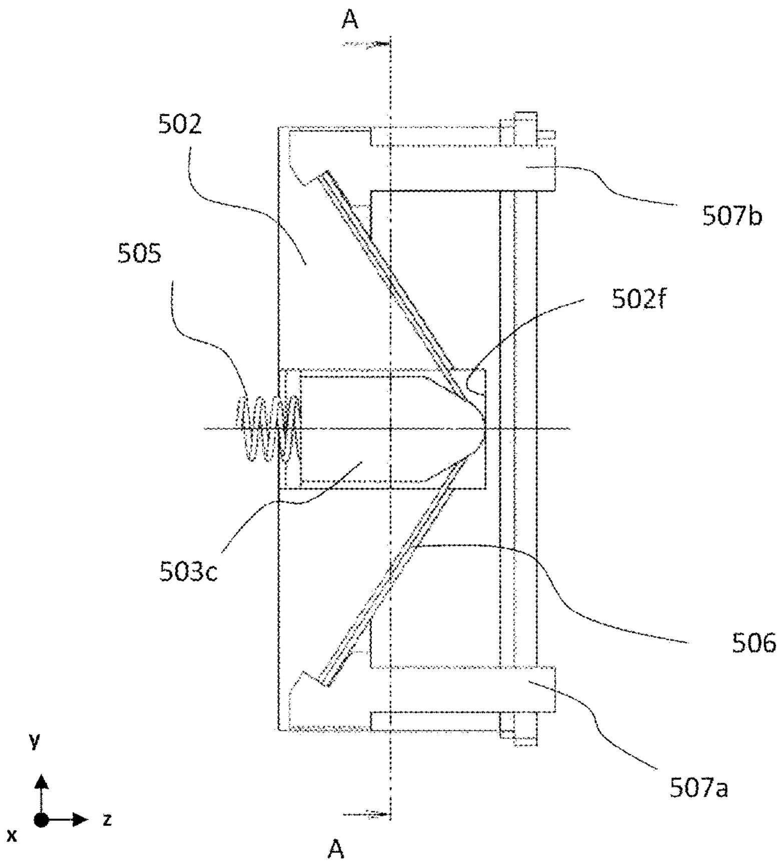
FIG. 34 is a side view showing that the cover 501 of the optical driving apparatus 500 is removed in the fifth embodiment.
Figure 35:
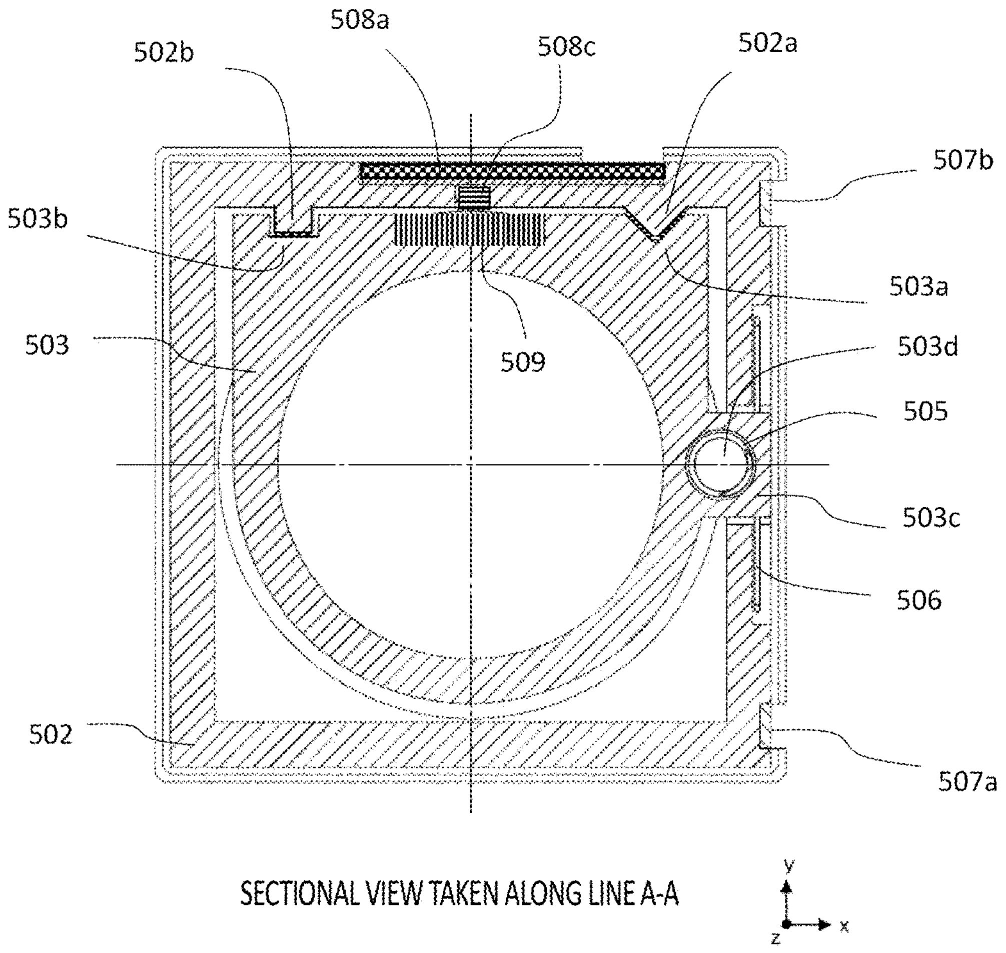
FIG. 35 is a sectional view taken along line A-A of FIG. 34.

FIG. 31 is a perspective view of an optical driving apparatus 500 in the fifth embodiment, FIG. 32 is a perspective view showing that a cover 501 of the optical driving apparatus 500 is removed in the fifth embodiment, FIG. 33 is an exploded perspective view showing a schematic configuration of the optical driving apparatus 500 in the fifth embodiment, FIG. 34 is a side view showing that the cover 501 of the optical driving apparatus 500 is removed in the fifth embodiment, and FIG. 35 is a sectional view taken along line A-A of FIG. 34.

The optical driving apparatus 500 shown in FIG. 31 to FIG. 35 is used by being incorporated in an apparatus, for example, an image capturing apparatus, which performs auto-focusing by moving a lens in an optical axis direction with respect to the fixed member. In the following description of the optical driving apparatus 500 in the fifth embodiment, duplicated descriptions are omitted for configurations identical or similar to the optical driving apparatus 100 in the first embodiment.

As shown in FIG. 31, the optical driving apparatus 500 in the fifth embodiment has the cover 501, the fixed frame 502 as the fixed member, the lens frame 503 as the driven member and the lens 504. As shown in FIG. 32, a first convex portion 502*a* in a V-shaped cross-sectional shape and a second convex portion 502*b* in a flat cross-sectional shape are formed on the upper side of the fixed frame 502. As shown in FIG. 33, a first groove 503*a* in a V-shaped cross-sectional shape and a second groove 503*b* in a flat cross-sectional shape are formed on the upper side of the lens frame 503. The first groove 503*a* is provided in a position facing the first convex portion 502*a*, and the second groove 503*b* is provided in a position facing the second convex portion 502*b*.

The first groove 503*a*, the first convex portion 502*a*, the second groove 503*b* and the second convex portion 502*b* compose the guiding member of the optical driving apparatus 500 in the fifth embodiment. Similar to the other embodiments, the lens frame 503 is movable without a large resistance in the optical axis direction of the lens 504 with respect to the fixed frame 502 (±z direction) by inserting the gel containing microspheres into the contact surface between the first groove 503*a* and the first convex portion 502*a*, and the contact surface between the second groove 503*b* and the second convex portion 502*b*.

As shown in FIG. 33 and FIG. 35, a metal plate 508*a*, a flexible board 508*b* and a hall element 508*c* are provided on the upper side of the fixed frame 502. A magnet 509 is provided on the upper side of the lens frame 503. The hall element 508*c* provided in the fixed frame 502 detects a magnetic field of the detecting magnet 509 provided in the lens frame 503, and detects a relative position with respect to the fixed frame 502 of the lens frame 503 in an optical axis direction of the lens 504 (±z direction). The hall element 508*c* equipped with the metal plate 508*a* is composed of a magnetic body, and the lens frame 503 is attracted toward the fixed frame 502 in the +y direction by the metal plate 508*a* and the magnet 509 attracting each other with a magnetic force. Accordingly, the free separation between the fixed frame 502 and the lens frame 503 is prevented.

As shown in FIG. 33, the convex portion 503*c* is formed on the side surface of the lens frame 503. In the convex portion 503*c*, the bottom-dwelling hole 503*d* in the optical axis direction is provided, and the coil spring 505 is housed. The notch 502*e* for inserting and fixing the convex portion 503*c* to the fixed frame 502 is formed. The coil spring 505 is compressed by being pushed in the optical axis direction (+z direction) by the cover 501 end surface when the cover 501 is adhered or otherwise fixed to the fixed frame 502, and the elastic force of the spring pushes the lens frame 503 in the optical axis direction (+z direction). In the normal state, the lens frame 503 rests in a position where the rear end portion of the convex portion 503*c* is in contact with the notch edge portion 502*f* of the fixed frame 502.

As shown in FIG. 33, a terminal board concave portion 502*c* and a terminal board concave portion 502*d* are formed on the side surfaces of the fixed frame 502. The metal terminal plate 507*a* is press-fitted into the terminal board concave portion 502*c* and fixed by adhesion or otherwise, and the metal terminal plate 507*b* is press-fitted into the terminal board concave portion 502*d* and fixed by adhesion or otherwise. The metal terminal plate 507*a* and the metal terminal plate 507*b* are terminals for energizing the SMA (Shape Memory Alloy) wire 506, which is a shape memory alloy. The metal terminal plate 507*a* and the metal terminal plate 507*b* are fixed to both ends of the SMA wire 506 by bonding or welding or the like. As shown in FIG. 34, the SMA wire 506 is hooked to the hook (not illustrated) at the rear end portion of the convex portion 503*c* of the lens frame 503 while the metal terminal plate 507*a* and the metal terminal plate 507*b* are fixed in a predetermined position of the fixed frame 502.

When a current flows through the SMA wire 506 by energizing the metal terminal plate 507*a* and the metal terminal plate 507*b*, the SMA wire 506 heats up and contracts. Therefore, the lens frame 503 is ejected in the optical axis direction (−z direction). When the current to the metal terminal plate 507*a* and the metal terminal plate 507*b* is cut off, the SMA wire 506 returns to its original length and the lens frame 503 is rolled back in the +z direction by the elastic force of the coil spring 505. As described above, the focusing operation of the optical driving apparatus 500 is performed by turning the power to the SMA wire 506 ON and OFF.

Effects of Fifth Embodiment

Effect 5-1

According to the optical driving apparatus 500 in the fifth embodiment, the lens frame 503, which is the driven member, is driven by the expansion and contraction of the SMA wire 506 and performs the focusing operation of the optical driving apparatus 500. The use of SMA wire 506, which is a shape memory alloy, as the driving member of the lens frame 503 provides excellent corrosion and wear resistance, as well as good repetition characteristics.

Effect 5-2

According to the optical driving apparatus 500 in the fifth embodiment, the same effects as (effect 1-1) to (effect 1-7) of the optical driving apparatus 100 in the first embodiment described above can be achieved.

Other Embodiments

In the above-described first to fifth embodiments, the arrangement of the grooves and convex portions for the fixed member and the driven member may be reversed. That is, the groove may be arranged in the fixed member and the convex portion may be arranged in the driven member, or the groove may be arranged in the driven member and the convex portion may be arranged in the fixed member. Similarly, the arrangement of the hall element and the magnet with respect to the fixed member and the driven member may be reversed. That is, the hall element may be arranged in the fixed member and the magnet may be arranged in the driven member, or the hall element may be arranged in the driven member and the magnet may be arranged in the fixed member.

In the above-described first to fifth embodiment, a first groove and a first convex portion in a V-shaped cross-sectional shape were used in combination with a second groove and a second convex portion in a flat cross-sectional shape. However, a combination of the first groove and the first convex portion in the V-shaped cross-sectional shape and the second groove and the second convex portion in the V-shaped cross-sectional shape may be used.

In the above-described third embodiment, it is described that it is desirable that the relational expression M>1.5 m×Dx2/Dx1 be satisfied for Dx1(mm), Dx2(mm), M(kgf) and m(kgf) shown in FIG. 22, and the relational expression M>1.5 m×Dy2/Dy1 be satisfied for Dy1(mm), Dy2(mm), M(kgf) and m(kgf) shown in FIG. 26. This relational expression may be similarly applied to other embodiments (the first, second, fourth and fifth embodiments) as well.

While the embodiments of the present invention have been explained, the technical scope of the present invention is not limited to the above-described embodiments. It is apparent to persons skilled in the art that various alterations or improvements can be added to the above-described embodiments. It is also apparent from the described scope of the claims that the embodiments added with such alterations or improvements can be included the technical scope of the present invention.

The operations, procedures, steps, stages, or the like of each process performed by a device, system, program, and method shown in the claims, specification, or drawings can be performed in any order as long as the order is not indicated by “prior to,” “before,” or the like and as long as the output from a previous process is not used in a later process. Even if the operation flow is described using phrases such as “first” or “then” in the claims, specification, or drawings, it does not necessarily mean that the process must be performed in this order.

EXPLANATION OF REFERENCES

1: sensor board; 1*a*: image sensor; 2: fixed frame; 2*a*: side; 2*b*: supporting member; 3: detecting unit; 3*a*: reinforcing plate; 3*b*: detecting magnet; 3*c*: hall element; 3*d*: FPC board; 4: guiding member; 4*a*: first convex portion; 4*a*': second convex portion; 4*b*: second convex portion; 4*c*: second groove; 4*c*': second groove; 4*d*: second groove; 4*e*: microspheres: 4*f*: gel; 5: driving unit; 5*a*: electromechanical converting element; 5*b*: drive shaft; 5*c*: coil spring; 5*d*: coil portion; 5*e*: arm portion; 5*f*: arm portion; 6: lens frame; 6*a*: side; 6*c*: contacting portion; 6*d*: contacting portion; 7: lens holder; 7*a*: lens; 8: cover; 21: image capturing sensor unit; 21*a*: image sensor; 22: base frame; 22*a*: supporting member; 23: x-direction moving frame; 23*a*: contacting portion; 23*b*: supporting member; 24: y-direction moving frame; 24*a*: contacting portion; 24*b*: supporting member; 24*c*: hole portion; 25: rotary frame; 25*a*: contacting portion; 26*a*: driving unit; 26*b*: driving unit; 26*c*: driving unit; 31: groove portion; 32: groove portion; 33: convex portion; 34: convex portion; 35: groove portion; 36: groove portion; 37: convex portion; 38: convex portion; 39: ball; 40: magnet; 41: plate; 42: detecting magnet; 43: hall element; 44: plate; 45: plate; 46: hall element; 47: detecting magnet; 48: plate; 50: gel; 51: piezoelectric element portion; 52: inactive portion; 53: external electrode; 54: flexible board; 55: solder mount; 56: insulating layer; 100: optical driving apparatus; 200: optical driving apparatus; 241*a*: engagement hole; 261*b*: electromechanical converting element; 262*b*: drive shaft; 263*b*: coil spring; 264*b*: coil portion; 265*b*: arm portion; 300: zoom camera unit; 310: fixed frame; 311: image capturing element fixing portion; 312: imaging side aperture; 314*a*: V-shaped convex portion; 314*b*: flat-shaped convex portion; 314*c*: V-shaped convex portion circumferential groove; 314*d*: flat-shaped convex portion circumferential groove; 315*a*: actuator holding portion; 315*a*': actuator holding portion; 315*b*: actuator holding portion; 315*b*': actuator holding portion; 320: cover; 321: subject side aperture; 330: lens position detecting portion; 331: plate; 332*a*: magnet; 332*b*: magnet; 333*a*: hall element; 333*b*: hall element; 335: FPC; 350: actuator portion; 351*a*: electromechanical converting element; 351*b*: electromechanical converting element; 352*a*: drive shaft; 352*b*: drive shaft; 353*a*: coil spring; 353*b*: coil spring; 354*a*: weight; 354*b*: weight; 360: first lens group; 370: second lens group; 380: third lens group; 384*a*: V-shaped groove; 384*b*: flat-shaped groove; 384*c*: V-shaped groove circumferential groove; 384*d*: flat-shaped groove circumferential groove; 384*e*: V-shaped groove edge slope; 384*f*: flat-shaped groove edge slope; 385: coil spring engagement portion; 390: fourth lens group; 394*a*: V-shaped groove; 394*b*: flat-shaped groove; 395: coil spring engagement portion; 400: lens driving apparatus; 401: cover; 402: bobbin; 403: driving unit; 404: supporting unit; 405: detecting unit; 406: plate; 407: base; 421: lens holding portion; 431: coil; 432: driving magnet; 433: metal plate; 441: V-shaped convex portion; 442: V-shaped groove; 443: flat-shaped convex portion; 444: flat-shaped groove; 445: gel; 451: hall element; 452: board; 453: detecting magnet; 500: optical driving apparatus; 502: fixed frame; 502*a*: first convex portion; 502*b*: second convex portion; 502*c*: terminal board concave portion; 502*d*: terminal board concave portion; 502*e*: notch; 502*f*: notch edge portion; 503: lens frame; 503*a*: first groove; 503*b*: second groove; 503*c*: convex portion; 503*d*: bottom-dwelling hole; 504: lens; 505: coil spring; 506: SMA wire; 507*a*: metal terminal plate; 507*b*: metal terminal plate: 508*a*: metal plate; 508*b*: flexible board; 508*c*: hall element; 509: magnet; p1: interspace; p2: interspace.

What is claimed is:

1. An optical driving apparatus, comprising:

a fixed member;

a driven member that is movable with respect to the fixed member; and a guiding member that restricts the driven member to move in a predetermined direction with respect to the fixed member, wherein the guiding member has:

a first groove in a V-shaped cross-sectional shape, which is formed on any one of the fixed member or the driven member;

a first convex portion fitting into the first groove, which is formed on another of the fixed member or the driven member; and a plurality of microspheres interposed in a gap between the first groove and the first convex portion and disposed in a longitudinal direction of the first groove and in a direction perpendicular to the longitudinal direction to generate rolling friction.

2. The optical driving apparatus according to claim 1, further comprising a magnetic body provided on any one of the fixed member or the driven member to attract the fixed member and the driven member.

3. The optical driving apparatus according to claim 2, wherein the guiding member further has:

a second groove in a flat cross-sectional shape, which is formed on any one of the fixed member and the driven member;

a second convex portion fitting into the second groove, which is formed on another of the fixed member or the driven member; and a plurality of microspheres interposed in a gap between the second groove and the second convex portion and disposed in a longitudinal direction of the second groove and in a direction perpendicular to the longitudinal direction to generate rolling friction, wherein the magnetic body is provided between a set of the first groove and the first convex portion and a set of the second groove and the second convex portion.

4. The optical driving apparatus according to claim 2, wherein the guiding member further has:

a second groove in a V-shaped cross-sectional shape, which is formed on any one of the fixed member and the driven member;

a second convex portion fitting into the second groove, which is formed on another of the fixed member or the driven member; and a plurality of microspheres interposed in a gap between the second groove and the second convex portion and disposed in a longitudinal direction of the second groove and in a direction perpendicular to the longitudinal direction to generate rolling friction, wherein the magnetic body is provided between a set of the first groove and the first convex portion and a set of the second groove and the second convex portion.

5. The optical driving apparatus according to claim 2, wherein a relationship of an attraction force of the magnetic body (M), a weight of the driven member (m), a distance between a reference point of the guiding member and a center of the magnetic body (D1), and a distance between the reference point of the guiding member and a center of gravity of the driven member (D2) is $M>1.5\ m\times D2/D1$.

6. The optical driving apparatus according to claim 1, wherein the guiding member further has:

a second groove in a flat cross-sectional shape, which is formed on any one of the fixed member and the driven member;

a second convex portion fitting into the second groove, which is formed on another of the fixed member or the driven member; and a plurality of microspheres interposed in a gap between the second groove and the second convex portion and disposed in a longitudinal direction of the second groove and in a direction perpendicular to the longitudinal direction to generate rolling friction.

7. The optical driving apparatus according to claim 1, wherein the guiding member further has:

a second groove in a V-shaped cross-sectional shape, which is formed on any one of the fixed member and the driven member;

a second convex portion fitting into the second groove, which is formed on another of the fixed member or the driven member; and a plurality of microspheres interposed in a gap between the second groove and the second convex portion and disposed in a longitudinal direction of the second groove and in a direction perpendicular to the longitudinal direction to generate rolling friction.

8. The optical driving apparatus according to claim 1, wherein a gel containing the microspheres is applied to a surface forming the first groove and a gel housing portion is provided therein to prevent diffusion of the microspheres.

9. The optical driving apparatus according to claim 1, wherein an inclined portion is provided at an edge of a surface forming the first convex portion to guide the microspheres into the gap.

10. The optical driving apparatus according to claim 1, wherein the driven member is driven by a SIDM (Smooth Impact Drive Mechanism).

11. The optical driving apparatus according to claim 1, wherein the driven member is driven by a VCM (Voice Coil Motor).

12. The optical driving apparatus according to claim 1, wherein the driven member is driven by an SMA (Shape Memory Alloy).

13. The optical driving apparatus according to claim 1, wherein a plurality of driven members, each being the driven member, are provided, and the plurality of driven members are driven independently of each other.

14. The optical driving apparatus according to claim 1, wherein the microspheres are non-magnetic bodies.

* * * * *